US007657905B2

(12) United States Patent
Kimoto

(10) Patent No.: US 7,657,905 B2
(45) Date of Patent: Feb. 2, 2010

(54) RECEIVER, PROGRAM RETRIEVAL METHOD, AND RECEIVING METHOD

(75) Inventor: Yosuke Kimoto, Tokyo (JP)

(73) Assignee: Sony Corporation (JP)

( * ) Notice: Subject to any disclaimer, the term of this patent is extended or adjusted under 35 U.S.C. 154(b) by 1060 days.

(21) Appl. No.: 10/021,495

(22) Filed: Oct. 29, 2001

(65) Prior Publication Data

US 2002/0049972 A1  Apr. 25, 2002

Related U.S. Application Data

(62) Division of application No. 09/284,698, filed as application No. PCT/JP98/03712 on Aug. 21, 1998, now Pat. No. 7,503,056.

(30) Foreign Application Priority Data

Aug. 21, 1997 (JP) ................................. P9-224690
Aug. 26, 1997 (JP) ................................. P9-229027

(51) Int. Cl.
*H04N 5/445* (2006.01)
(52) U.S. Cl. .................... 725/44; 725/134; 725/142; 348/734
(58) Field of Classification Search ............. 725/37–61, 725/68, 85, 100, 131, 139, 151, 134, 142; 348/734
See application file for complete search history.

(56) References Cited

U.S. PATENT DOCUMENTS

| 4,729,027 A | 3/1988 | Hakamada et al. | |
| 5,361,173 A | 11/1994 | Ishii et al. | |
| 5,371,550 A * | 12/1994 | Shibutani et al. | 348/570 |
| 5,386,247 A * | 1/1995 | Shafer et al. | 348/687 |
| 5,438,377 A * | 8/1995 | Chang | 348/731 |
| 5,442,390 A * | 8/1995 | Hooper et al. | 725/90 |
| 5,448,313 A * | 9/1995 | Kim et al. | 348/734 |
| 5,517,254 A * | 5/1996 | Monta et al. | 348/569 |
| 5,532,754 A * | 7/1996 | Young et al. | 725/47 |
| 5,589,892 A * | 12/1996 | Knee et al. | 725/43 |
| 5,590,340 A * | 12/1996 | Morita et al. | 713/323 |
| 5,596,373 A | 1/1997 | White et al. | |

(Continued)

FOREIGN PATENT DOCUMENTS

JP  62-159583  7/1987

(Continued)

*Primary Examiner*—Annan Q Shang
(74) *Attorney, Agent, or Firm*—Lerner, David, Littenberg, Krumholz & Mentlik, LLP

(57) ABSTRACT

An EPG object of a program A to be broadcast from 19:00 to 20:49 is copied to generate a first clone EPG object and a second clone EPG object. 00 minute is set as the relative start time of the first clone EPG object, and 59 minutes is set as the relative end time. 00 minutes is set as the relative start time of the second clone EPG object, and 49 minutes is set as the relative end time. With reference to the relative times, the clone EPG object is allocated to each time zone with a range of one hour. The first clone EPG object of the program A is allocated to a time zone of 19:00 to 19:59, and the second clone EPG object is allocated to a time zone of 20:00 to 20:59. Retrieval is carried out for each time zone. Thus, a program of a predetermined broadcast time can be quickly retrieved.

12 Claims, 23 Drawing Sheets

U.S. PATENT DOCUMENTS

| | | | |
|---|---|---|---|
| 5,630,119 A | 5/1997 | Aristides et al. | |
| 5,635,978 A | 6/1997 | Alten et al. | |
| 5,659,366 A * | 8/1997 | Kerman | 725/34 |
| 5,793,438 A | 8/1998 | Bedard | |
| 5,805,763 A | 9/1998 | Lawler et al. | |
| 5,812,124 A | 9/1998 | Eick et al. | |
| 5,844,620 A | 12/1998 | Coleman et al. | |
| 5,867,207 A | 2/1999 | Chaney et al. | |
| 5,929,932 A | 7/1999 | Otsuki et al. | |
| 5,977,964 A * | 11/1999 | Williams et al. | 715/721 |
| 6,115,024 A * | 9/2000 | Hayama | 345/23 |
| 6,147,714 A * | 11/2000 | Terasawa et al. | 348/564 |
| 6,163,316 A * | 12/2000 | Killian | 715/721 |
| 6,166,778 A | 12/2000 | Yamamoto et al. | |
| 6,177,931 B1 * | 1/2001 | Alexander et al. | 725/52 |
| 6,260,195 B1 * | 7/2001 | Takahashi | 725/136 |
| 6,526,579 B2 * | 2/2003 | Sato | 725/58 |
| 6,542,169 B1 | 4/2003 | Marshall et al. | |
| 6,600,503 B2 * | 7/2003 | Stautner et al. | 715/854 |
| 6,678,462 B1 * | 1/2004 | Chihara | 386/83 |
| 6,732,572 B1 * | 5/2004 | Pickert et al. | 73/54.01 |
| 7,158,188 B1 * | 1/2007 | Ichifuji et al. | 348/563 |
| 7,546,621 B2 * | 6/2009 | LaJoie et al. | 725/39 |
| 2006/0195868 A1 * | 8/2006 | Townsend et al. | 725/59 |

FOREIGN PATENT DOCUMENTS

| | | |
|---|---|---|
| JP | 1-99382 | 4/1989 |
| JP | 01-099382 A | 4/1989 |
| JP | 06-205315 A | 7/1994 |
| JP | 06-311444 A | 11/1994 |
| JP | 08-111823 A | 4/1996 |
| WO | WO-96/7270 A1 | 3/1996 |
| WO | WO-96/31980 A1 | 10/1996 |
| WO | WO-97/18670 A1 | 5/1997 |

* cited by examiner

RECEIVER, PROGRAM RETRIEVAL METHOD, AND RECEIVING METHOD

CROSS REFERENCE TO RELATED APPLICATIONS

This application is a divisional of application Ser. No. 09/284,698 filed Jul. 15, 1999 now U.S. Pat. No. 7,503,056, which is a national stage application under 35 U.S.C. § 371 of International Application No. PCT/JP98/03712 filed Aug. 21, 1998, which claims priority from Japanese Application No. P9-224690 filed Aug. 21, 1997 and Japanese Application No. P9-229027 filed Aug. 26, 1997, the disclosures of which are hereby incorporated by reference herein.

BACKGROUND OF THE INVENTION

This invention relates to a receiver, a program retrieval method, and a receiving method. Particularly, it relates to a receiver, a program retrieval method, and a receiving method which enable quick retrieval of a desired program from a plurality of programs. Recently, there has been significant digitization in television broadcast, particularly in the field of satellite broadcast, and the number of channels has increased to not less than 100. As the number of channels has thus increased, it is difficult to select a desired program from programs of multiple channels. Thus, in order to support program selection, it is proposed that an electronic program guide (EPG) should be transmitted from the side of a program provider. In this case, using this EPG, the user can select, receive and display a desired program quickly and securely, and can also reserve recording of that program. FIG. 1 shows an exemplary display of a program selection screen of such EPG. In this example, miniature images showing the contents of programs are displayed in 4×4 divided small screens. The small screens showing the contents of programs are selected by using a cursor 201.

FIG. 2 shows an exemplary structure of a remote controller used for carrying out such program selection. In this example, number buttons 202 and cursor buttons 203 are provided. When there are a large number of channels, it is difficult to select a program using the number buttons 202. Therefore, in the program selection screen as shown in FIG. 1, it is normal to carry out program selection using the cursor buttons 203. By operating the cursor buttons 203, the user can move the cursor 201 up, down, left and right. Then, by locating the cursor 201 on a miniature image of a desired program and operating a decide button 204, the user can select that program.

FIG. 3 shows another exemplary display of the EPG program selection screen. In this example, six channels are displayed as a channel list 211, and programs to be broadcast (or being broadcast) are displayed in each time zone for the respective channels, as a program table 213. Similarly to the case of FIG. 1, by operating the cursor buttons 203 on the remote controller to locate a cursor 212 on a desired program and then operating the decide button 204, the user can select that program.

As the number of programs is thus increased, in the case where a program of a predetermined broadcast time is to be retrieved and displayed on a display, the following problems arise. That is, such retrieval is time-consuming and the time required for displaying the retrieval result after the user's command of retrieval is elongated, thus deteriorating the operability.

Also, such conventional EPG is only similar to a program page prescribed by the channel and broadcast time, as shown in newspaper and program information magazines, and cannot support effective providing of each program to each user. Therefore, program selection is complicated, causing a problem that a desired program cannot be selected quickly.

SUMMARY OF THE INVENTION

In view of the foregoing status of the art, it is an object of the present invention to enable quick and secure selection of a desired program.

In order to solve the foregoing problems, a receiver according to the present invention is adapted for receiving broadcast signals multiplexed with program guide information including at least broadcast time information of programs. The receiver includes a receiving unit operable to receive broadcast signals; a separation unit operable to separate the program guide information from the received broadcast signals; means for carrying out display processing based on the separated program guide information; a storage unit operable to store information indicating whether contents displayed immediately before turning off a power source for the receiver is a program guide or an image of a program; and a display controller operable to display the program guide or a predetermined program image as an initial image corresponding to the information stored in the storage unit when the power source is turned on.

A receiving method according to the present invention is adapted for use with a receiver having a power source, and receives broadcast signals multiplexed with program guide information including at least broadcast time information of programs. The method includes receiving broadcast signals; separating the program guide information from the received broadcast signals; carrying out display processing based on the separated program guide information; storing information indicating whether contents displayed immediately before turning off the power source is a program guide or an image of a program; and displaying the program guide or a predetermined program image as an initial image corresponding to the stored information when the power source is turned on.

Preferred embodiments of the present invention will now be described with reference to the drawings.

DETAILED DESCRIPTION

Figure 1:
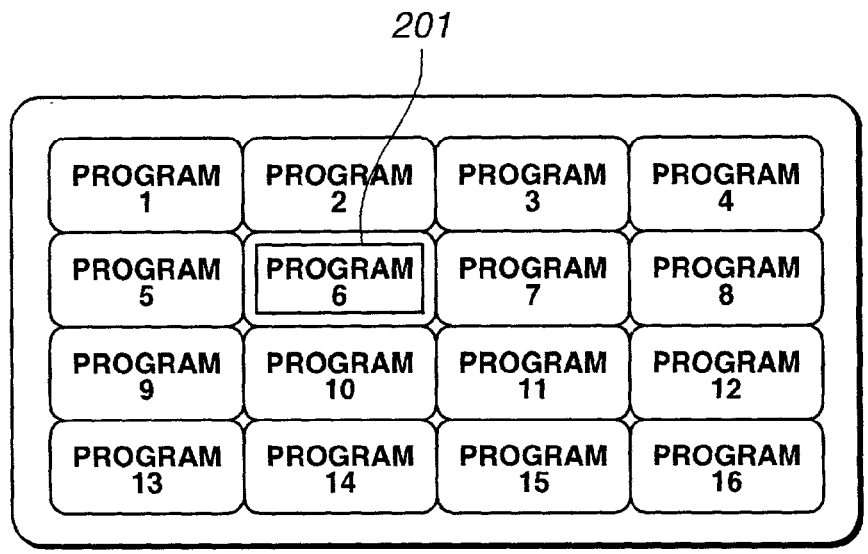
FIG. 1 shows an exemplary display of a program selection screen of a conventional EPG.
Figure 2:
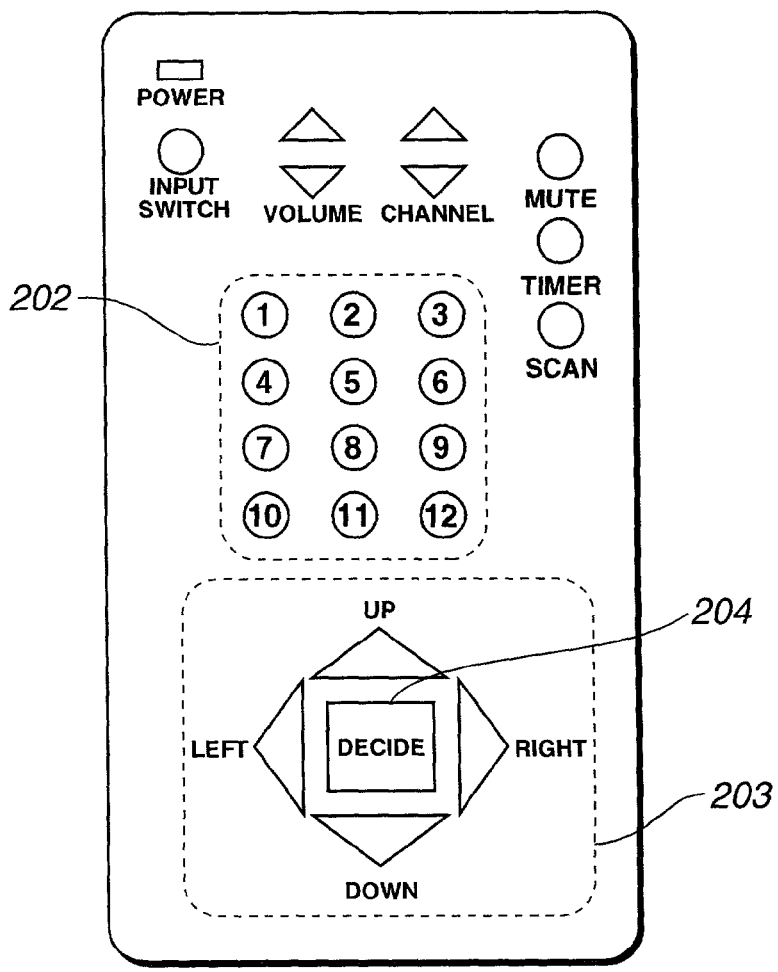
FIG. 2 shows an exemplary structure of a conventional remote controller.
Figure 3:
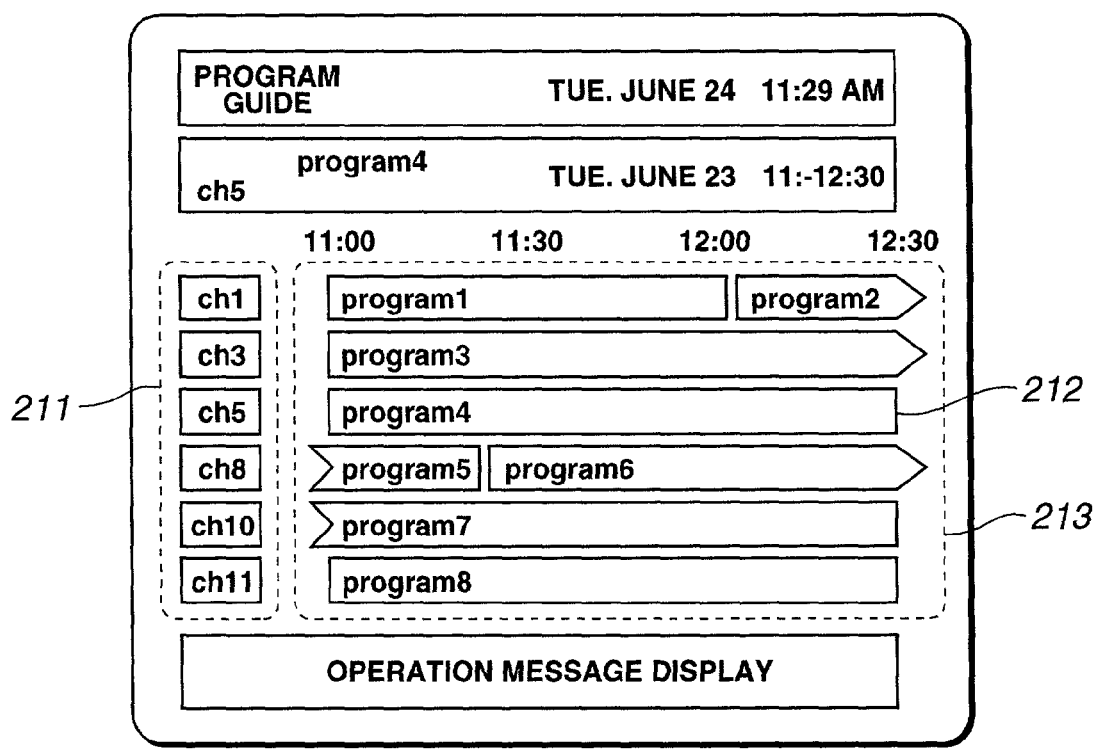
FIG. 3 shows another exemplary display of the program selection screen of the conventional EPG.
Figure 4:
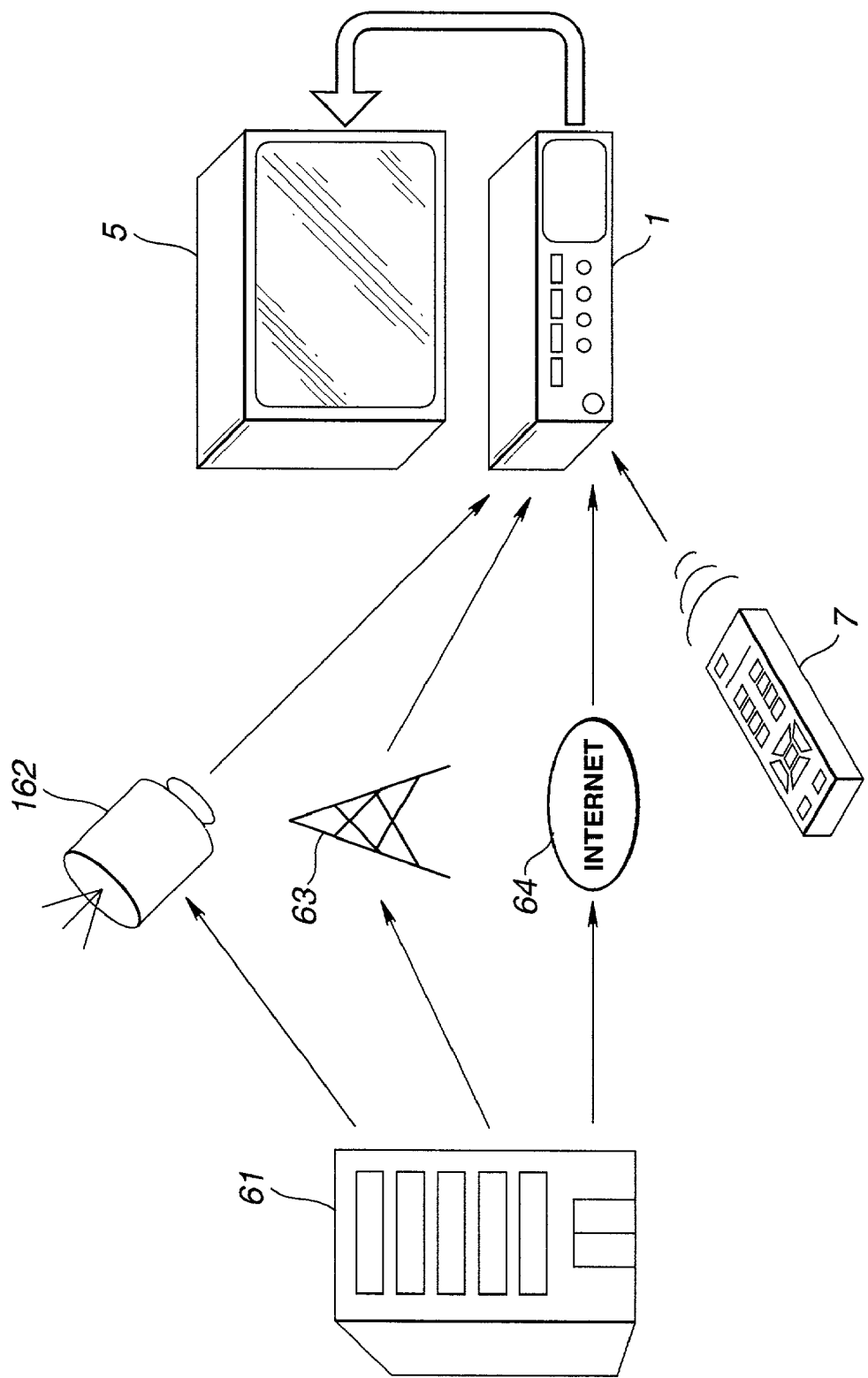
FIG. 4 illustrates an AV system and a communication network to which the present invention is applied.

FIG. 4 illustrates an AV system and a communication network to which the present invention is applied. In this example, a monitor 5 is connected to a receiving device 1 constituted as a set-top box. A program and an EPG transmitted from a program broadcasting company 61 are received by the receiving device 1 through a satellite 162, a broadcasting antenna 63, the Internet 64 or the like. In addition to the EPG distributed from the program broadcasting company 61, an EPG is also distributed from a television guide service company and the like, not shown. The receiving device 1 receives an infrared signal which is outputted from a remote controller 7 operated by the user, and carries out processing corresponding to the received signal. Then, the receiving device 1 displays a predetermined program or an EPG image on the monitor 5.

Figure 5:
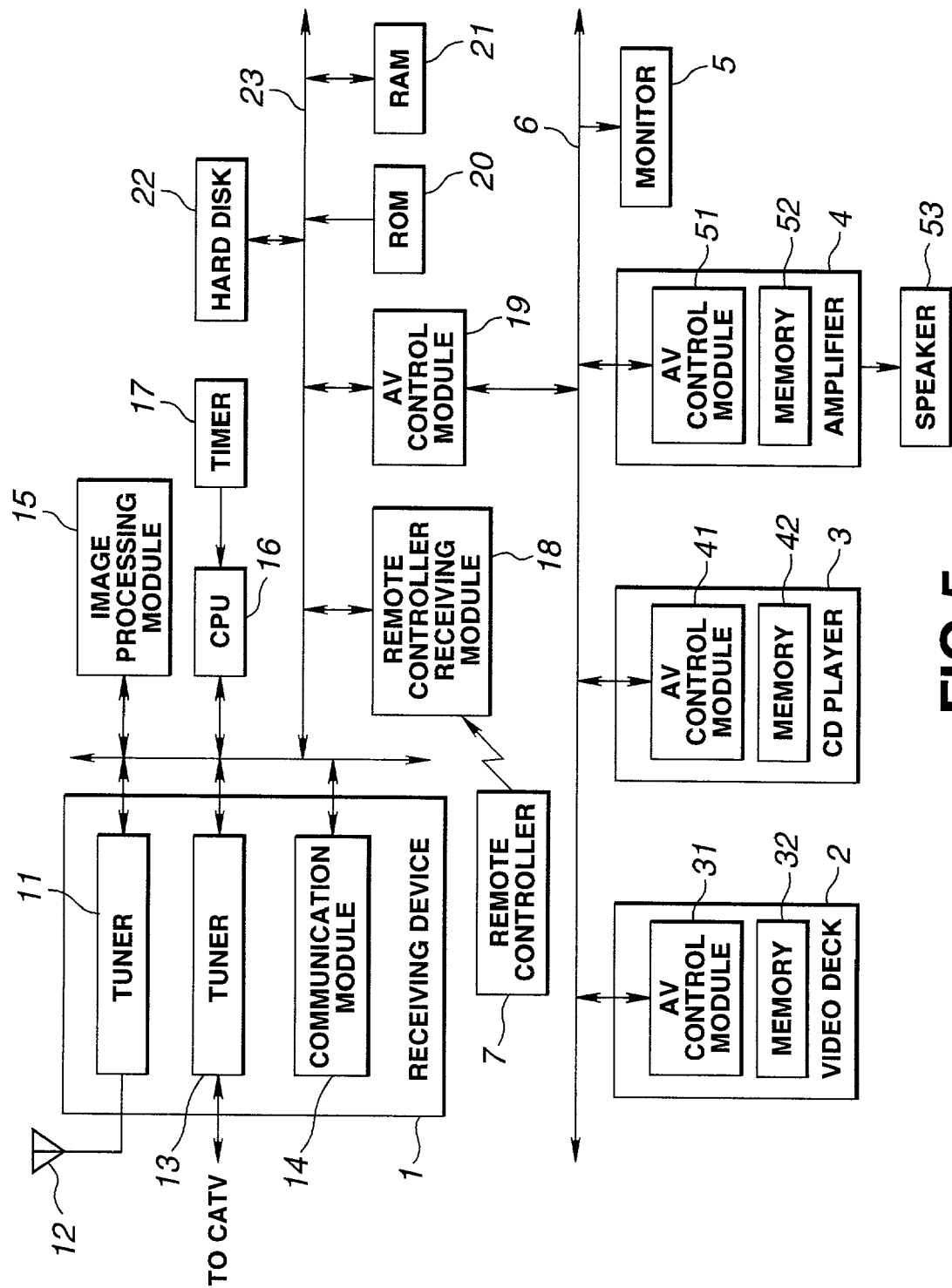
FIG. 5 is a block diagram showing an exemplary structure of the AV system to which the present invention is applied.

FIG. 5 shows an exemplary structure of the AV system of FIG. 4. In this AV system, the receiving device 1, a video deck 2, a CD player 3, an amplifier 4 and the monitor 5 are interconnected by an IEEE 1394 bus 6.

The receiving device 1 has a tuner 11, a tuner 13, and a communication module 14. The tuner 11 receives television broadcast of ground waves or from a satellite through an antenna 12. The tuner 13 receives cable television broadcast. The communication module 14 is connected to a telephone line so as to carry out communication through the Internet and other networks.

An image processing module 15 is adapted for processing image signals supplied from the tuners 11, 13 or the communication module 14. A CPU 16 is adapted for executing various kinds of processing in accordance with programs stored in a ROM 20. A timer 17 constantly carries out timekeeping operation and provides time information to the CPU 16. A remote controller receiving module 18 receives an infrared signal outputted from the remote controller 7 and outputs a signal corresponding to the received signal to the CPU 16.

An AV control module 19 is connected to the IEEE 1394 bus 6 and is adapted for carrying out interface processing with respect to transmission and reception of signals between the video deck 2, the CD player 3, the amplifier 4 and the monitor 5 as other information processing units connected to the IEEE 1394 bus 6. In a RAM 21, various data and programs necessary for the CPU 16 to execute various processing are stored, if necessary. On a hard disk 22, various kinds of information including the EPG is stored. An internal bus 23 interconnects the respective modules inside of the receiving device 1.

The video deck 2 has an AV control module 31 for carrying out interface processing with the IEEE 1394 bus 6, and a memory 32 for storing various kinds of information. Similarly to the video deck 2, the CD player 3 has an AV control module 41 and a memory 42. The amplifier 4 has an AV control module 51 for carrying out interface processing with the IEEE 1394 bus 6, and a memory 52 for storing various kinds of data. In addition, a speaker 53 is connected to the amplifier 4.

Figure 6:
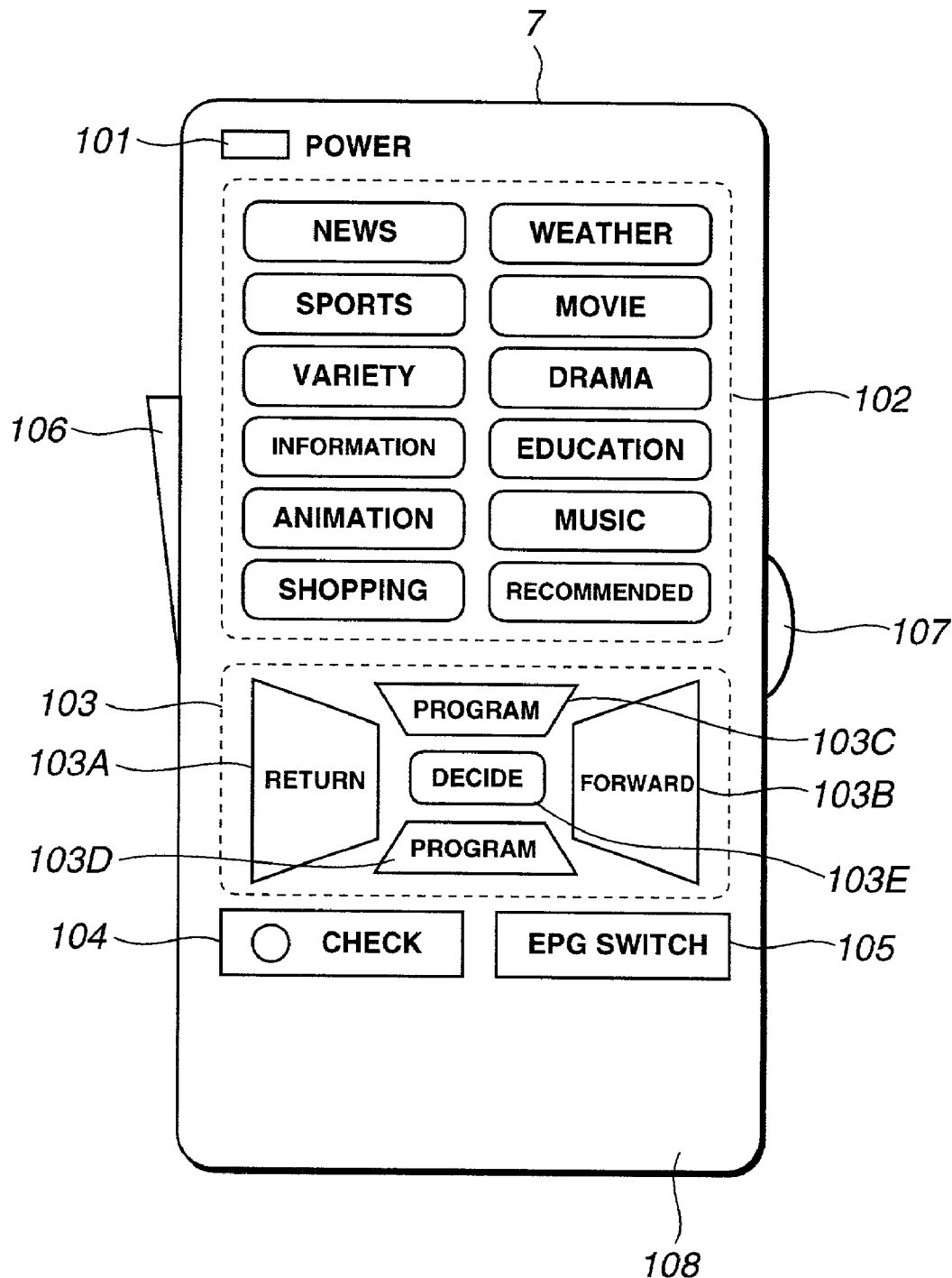
FIG. 6 shows the detailed structure of a remote controller 7 of FIG. 5.
Figure 7:
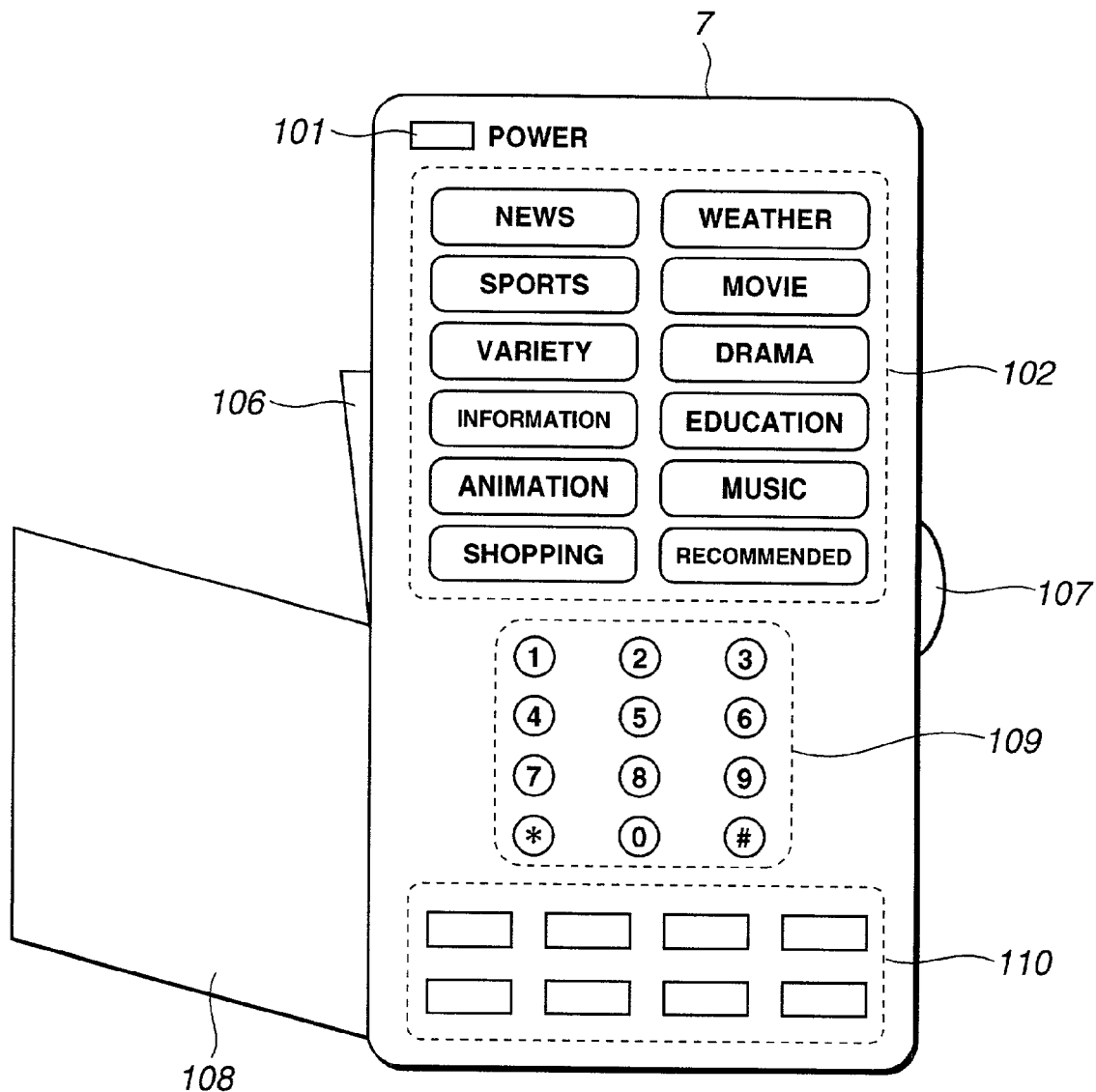
FIG. 7 shows the detailed structure of a remote controller 7 of FIG. 5.

FIGS. 6 and 7 show an exemplary structure of the remote controller 7. A power button 101 is operated for turning on or off the power source of the receiving device 1. Genre selection buttons 102 are operated for selecting a predetermined genre. In this example, genre selection buttons of "news", "sports", "variety," "information", "animation", "shopping", "weather", "movie," "drama," "education," "music," and "recommended" are provided.

Below the genre selection buttons 102, program selection cursor buttons 103 are provided. These program selection cursor buttons 103 are made up of a button 103C to be operated for moving a cursor up, a button 103D to be operated for moving the cursor down, a button 103A to be operated for return operation, a button 103B to be operated for forward operation, and a button 103E to be operated for decision processing.

A prefer button 104 is operated for registering a predetermined program to a preferred program list. An EPG switch button 105 is operated for selecting a predetermined kind of EPG from plural kinds of EPG.

A guide button 106 provided on the left lateral side of the remote controller 7 is operated for displaying an assistant screen. A sound adjustment dial 107 provided on the right lateral side of the remote controller 7 is turned up or down to adjust sounds. When the sound adjustment dial 107 is pressed down, a sound output system selection mode is set. In this state, by turning the dial up or down, then selecting a desired sound output system such as a bilingual output system, and pressing the dial 107 again, the current sound output system is switched to the selected sound output system.

A cover 108 can be opened or closed. When the cover 108 is opened, number buttons 109 and various setting buttons 110 appear as shown in FIG. 7. The number buttons 109 are operated for inputting numerals such as telephone numbers. The various setting buttons 110 are operated for carrying out predetermined setting.

When a predetermined button on the remote controller 7 is operated, an infrared signal is generated and received by the remote controller receiving module 18 of the receiving device 1. The remote controller receiving module 18 outputs a signal corresponding to the operated button to the CPU 16. The CPU 16 executes processing corresponding to the operated button.

Figure 8:
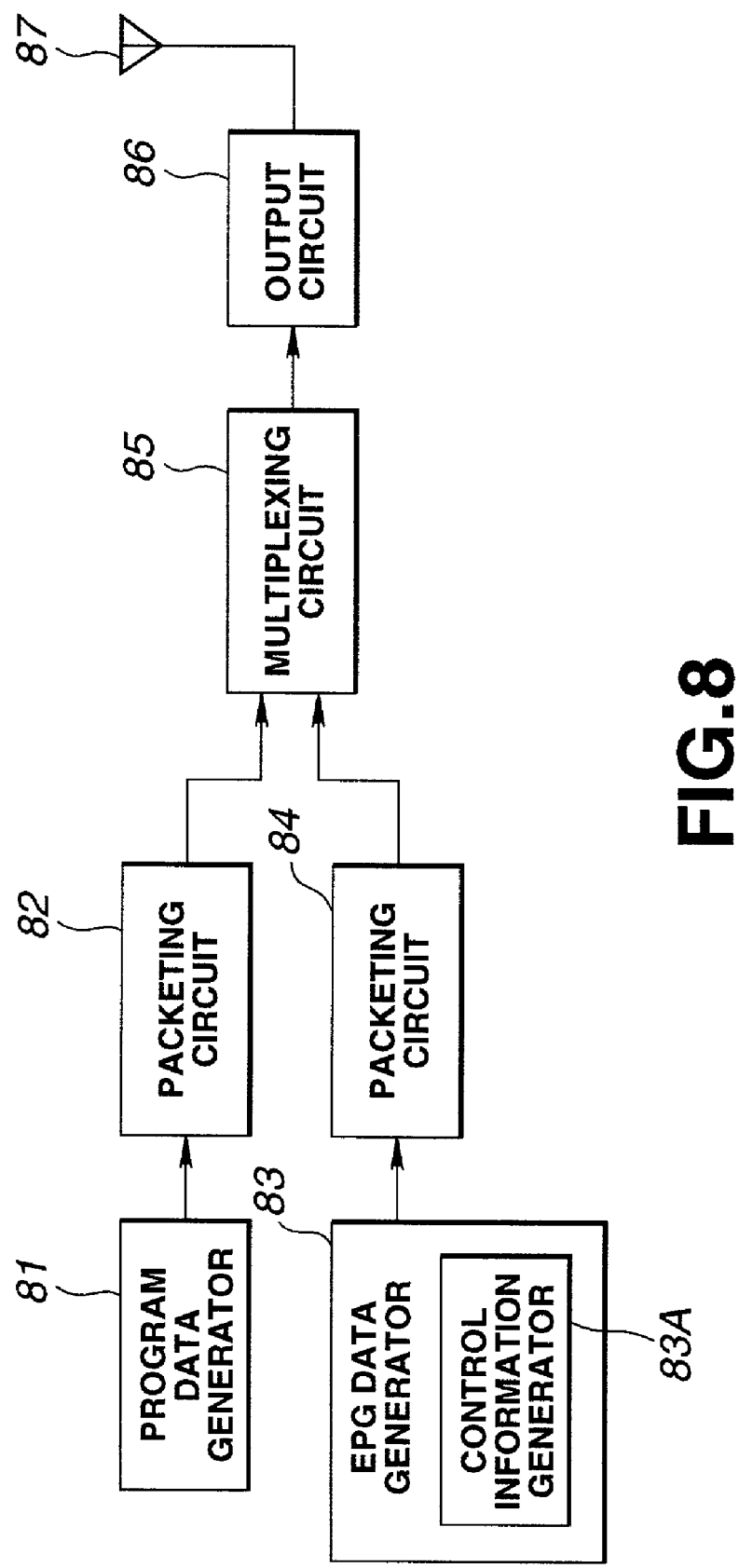
FIG. 8 is a block diagram showing an exemplary structure of a transmitting device.

FIG. 8 shows an exemplary structure of a transmitting device. A program data generator 81 is made up of a video deck or the like, and generates program data to be broadcast. A packeting circuit 82 packets the program data and outputs the packeted data to a multiplexing circuit 85.

Figure 14:
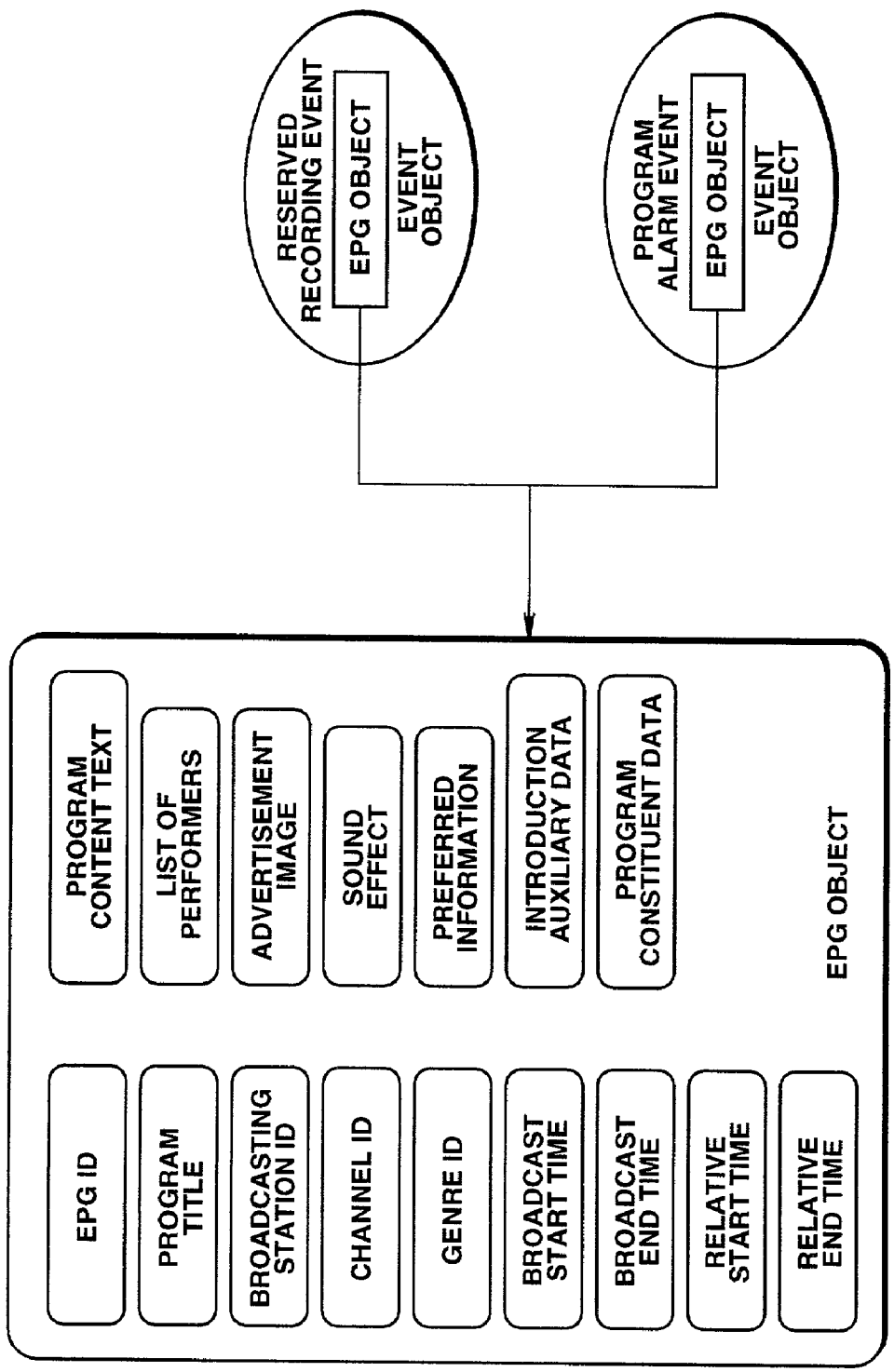
FIG. 14 shows the internal structure of the EPG.

An EPG data generator 83 generates an EPG object for each program generated by the program data generator 81. This EPG object, which is generated by an editor, includes EPG ID for identifying the EPG object, program title, broadcasting station ID for identifying the broadcasting station, channel ID for identifying the channel, genre ID for identifying the genre of the program, broadcast start time of the program, broadcast end time, advertisement image, list of performers, program content text, sound effect, preferred information, introduction auxiliary data, program constituent data and the like, as shown in FIG. 14, which will be later described.

In this specification, the EPG object is constructed in an object form as a component program constituting the EPG on the basis of the concept of so-called object-oriented program.

The sound effect and the program constituent data in the EPG are generated by a control information generator 83A. The sound effect is adapted for prescribing the sound effect of a program corresponding to the EPG object, to the sound effect in a dome, an outdoor stage, an opera house, a stadium, or a martial arts gymnasium. The program constituent data is adapted for prescribing image data or sound data constituting the program.

The EPG data generated by the EPG data generator 83 is transformed into an object and then supplied to a packeting circuit 84 as an EPG object. The EPG object is packeted by the packeting circuit 84 and then supplied to the multiplexing circuit 85.

The multiplexing circuit 85 multiplexes the program data supplied from the packeting circuit 82 and the data of the EPG object supplied from the packeting circuit 84, and outputs the multiplexed data to an output circuit 86. The output circuit 86 modulates the multiplexed data by a predetermined system and transmits the modulated data through an antenna 87.

As described above, the EPG object includes the sound effect for realizing effective stage effects and procedures for carrying out production of introductory constitution of the program and advertisement, other than the broadcast time of the program and the program introductory contents. Since the EPG object thus includes the procedures for such processing, the user can experience a program which is effective and full of variety, without carrying out particular operation.

The operation of the transmitting device of FIG. 8 will now be described. The program data generated by the program data generator 81 is packeted by the packeting circuit 82, then supplied to the output circuit 86 through the multiplexing circuit 85, and transmitted from the antenna 87.

Figure 9:
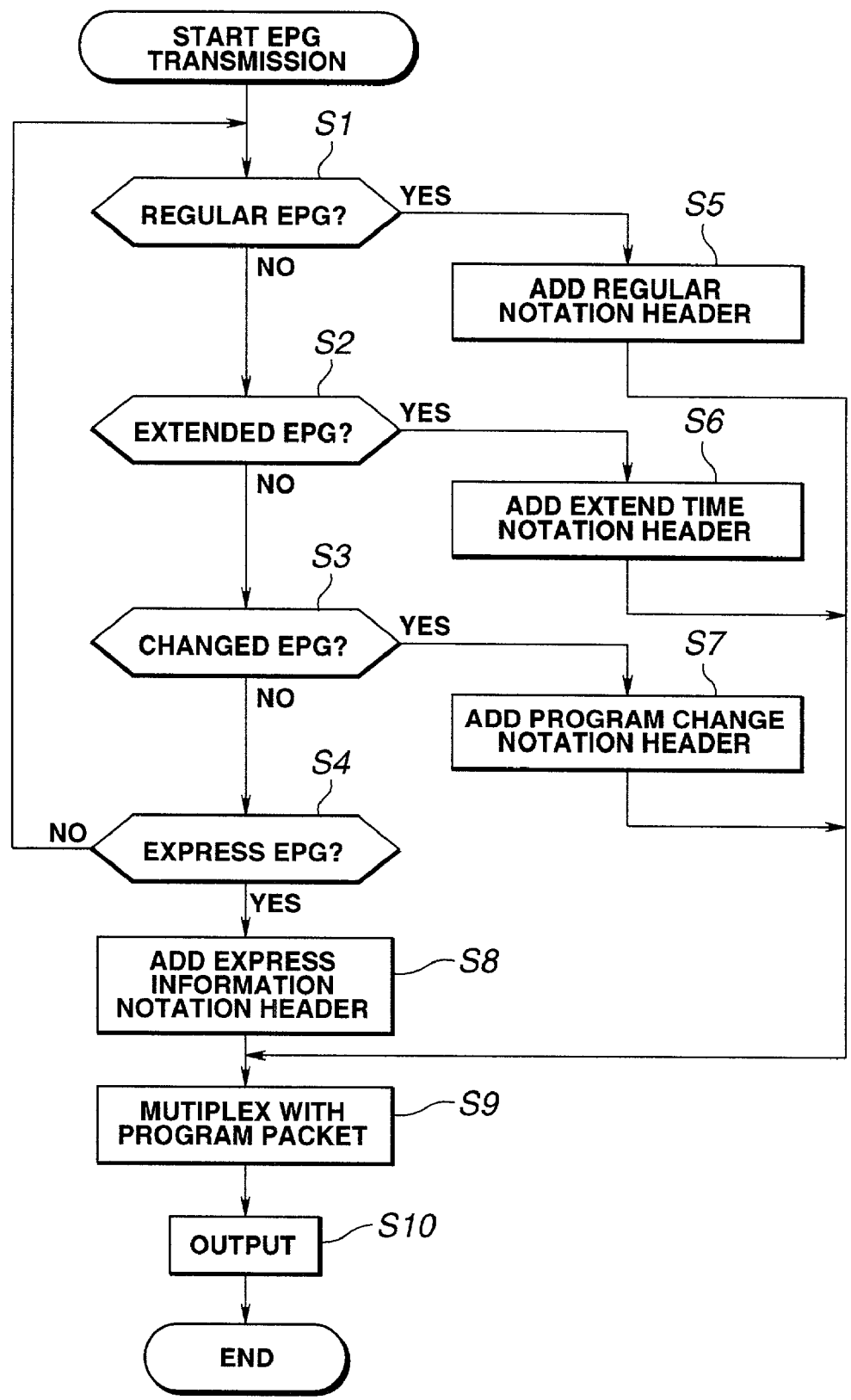
FIG. 9 is a flowchart for explaining EPG transmission processing in the example of FIG. 8.

Meanwhile, in this transmitting device, the EPG data is transformed into an object, then multiplexed and transmitted, with respect to the program data. This EPG transmission processing will be described with reference to the flowchart of FIG. 9.

First, at step 51, it is determined whether the EPG to be transmitted is a regular EPG or not. A regular EPG means an EPG to be periodically transmitted each hour.

Specifically, the same EPG data is transmitted every minute during the period of 5:00 to 5:59, and updated EPG data is transmitted during the period of 6:00 to 6:59. Similarly, updated EPG data is transmitted basically every hour.

Figure 10:
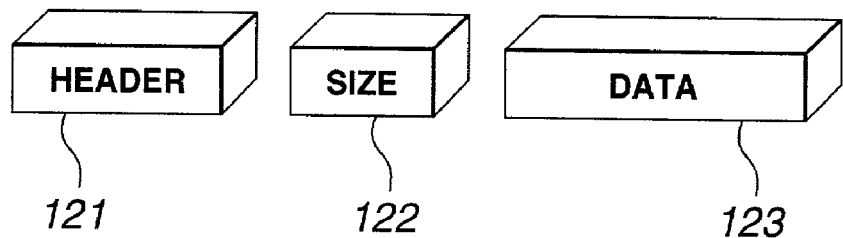
FIG. 10 illustrates an EPG packet.

If it is determined at step S1 that the EPG to be transmitted is a regular EPG, the processing goes to step S5 to add a regular notation header to the header of the EPG packet. As shown in FIG. 10, a header 121 is followed by a size 122 indicating the length of data and then by data 123 indicating the contents of the EPG object. In the communication packet shown in FIG. 10, the regular notation, extend time notation, program change notation and express information notation, as will be later described, can be stored in the header 121. The data length can be stored in the size 122, and the EPG object, updated data of program information and emergency message can be stored in the data 123.

Such data is supplied to the packeting circuit 84 and is packeted there. Then, at step S9, the packeted data is multiplexed by the multiplexing circuit 85 with a program packet supplied from the packeting circuit 82. At step S10, the multiplexed data is outputted from the output circuit 86 through the antenna 87.

On the other hand, if it is determined at step S1 that the EPG to be transmitted is not a regular EPG, the processing goes to step S2 to determine whether the EPG to be transmitted is an extended EPG or not. An extended EPG is an EPG to be transmitted when necessary in the case where the program is extended. If it is determined at step S2 that the EPG to be transmitted is an extended EPG, the processing goes to step S6 to add an extend time notation header to the packet header of the EPG packet. The resulting data is packeted by the packeting circuit 84. At this point, time information of the extended program is registered as the data of the EPG packet.

This packet, too, is multiplexed with the program packet by the multiplexing circuit 85, at step S9. At step S10, the multiplexed data is outputted from the output circuit 86 through the antenna 87.

If it is determined at step S2 that the EPG to be transmitted is not an extended EPG, the processing goes to step S3 to determine whether the EPG to be transmitted is a changed EPG or not. A changed EPG is a packet for changing the schedule of programs, and is transmitted every time a change is made. In this case, the processing goes to step S7 and a program change notation header is added by the packeting circuit 84.

If it is determined at step S3 that the EPG to be transmitted is not a changed EPG, the processing goes to step S4 to determine whether the EPG to be transmitted is an express EPG or not. An express EPG is an EPG for provisionally transmitting information concerning the program. If it is determined at step S4 that the EPG to be transmitted is an express EPG, the processing goes to step S8 and an express information notation header is added to the EPG packet header by the packeting circuit 84.

The packet having the header added thereto at step S7 or S8 is multiplexed with the program packet at step S9 and is then outputted at step S9, similarly to the above-described case.

If it is determined at step S4 that the EPG to be transmitted is not an express EPG, the processing returns to step S1 and the subsequent processing is repeatedly carried out.

Figure 11:
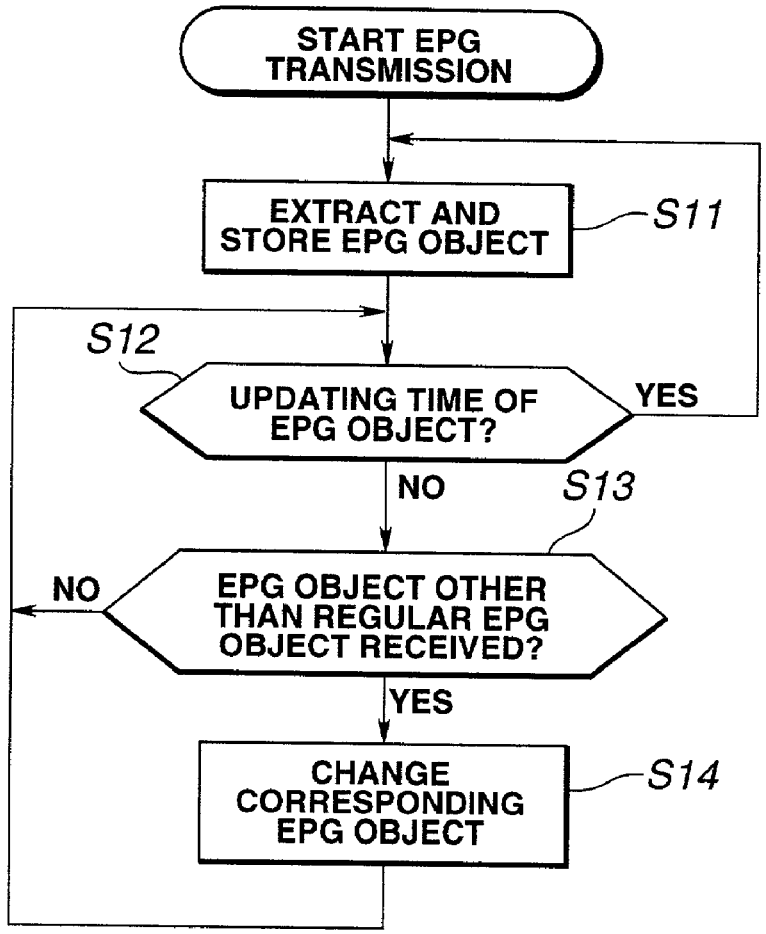
FIG. 11 is a flowchart for explaining processing for receiving an EPG packet in a receiving device 1 of FIG. 5.

The EPG object thus transmitted from the transmitting device is received by the receiving device 1 in such a manner as shown in the flowchart of FIG. 11.

Specifically, on receiving the packet transmitted from the transmitting device through the antenna 12, the tuner 11 demodulates the packet and outputs the demodulation result to the CPU 16. The CPU 16, at step S11, separates the program data packet and the EPG object from the received data, and causes the hard disk 22 to store the EPG object. After the main power is turned on, first, the EPG object is thus stored onto the hard disk 22. After that, the processing goes to step S12 to determine whether the present time is an updating time of the EPG object or not. In this example, the EPG object is updated once an hour. Therefore, when the present time becomes an updating time such as five o'clock or six o'clock, the processing goes to step S11 to extract, store and update the EPG object which is transmitted again.

If it is determined at step S12 that the present time is not an updating time of the EPG object, the processing goes to step S13 to determine whether or not the received EPG object is an EPG object other than a regular EPG object. If the received EPG object is a regular EPG object, the processing returns to step S12 to repeat the processing of steps S12 and S13.

If it is determined at step S13 that the received EPG object is an object other than a regular EPG object, that is, an extended EPG object, a changed EPG object, or an express EPG object, the processing goes to step S14 to carry out processing for changing the contents of the EPG object already stored on the hard disk 22, corresponding to the received EPG object. After that, the processing returns to step S12 and the subsequent processing is repeatedly carried out.

The EPG object, immediately after transmission, has only basic program information such as broadcast start time and program title. To update this information, several updating messages are used. The configuration of a basic message is defined as follows.

[key,messageType,message]

In this definition, "key" includes channel ID, broadcasting station ID, and broadcast (start and end) time, and designates a program to which the message should be transmitted. "messageType" indicates the type of update processing. "message" is information necessary for carrying out update processing, and may not be required depending on the message type. In such case, "message" is defined as "null".

The individual messages will be described hereinafter.

epgChangeSynopsisText
message: [key,EPG_CHANGE_SYNOPSIS_TEXT, newSynosis]

This message is to change the contents of a program made up of text data. In the "message", the contents of the program to be changed are stored as text data.

epgChangeCast
message: [key,EPG_CHANGE_CAST,newCast]

This message is to update the list of performers. The list of performers is defined as arrays of character strings.

epgChangeAtmosphere
message: [key,EPG_CHANGE_ATMOSPHERE,newAtmosphere]

This message is to change the sound effect.

epgDeleteProgram
message: [key,EPG_DELETE_PROGRAM,null]

This message is to delete a program.

epgReplaceProgram
message: [key,EPG_REPLACE_PROGRAM,newEpg]

This message is to replace a program.

epgNestContents
message: [key,EPG_NEST_CONTENTS,newContents]

This message is to provide linkage to data which will be transmitted later such as dynamic image data and sound data, in order to make the program introductory contents more effective.

epgExtendTime
message: [key,EPG_EXTEND_TIME,newTime]

This message is to notify extension of the broadcast end time of a program.

The EPG object is constituted for each program. The EPG object includes the auxiliary data such as dynamic image data and sound data for program introduction, as described above. If all these data are intended to be stored onto the hard disk 22, the storage capacity of the hard disk must be significantly increased. Thus, in order to prevent this, it is possible to cause the EPG object to initially include only the minimum necessary information such as the text and broadcast time, and to transmit the dynamic image data and sound data one to two hours before they become necessary. The EPG data of the program on completion of broadcast is deleted unless saving thereof is intentionally commanded.

Figure 12:
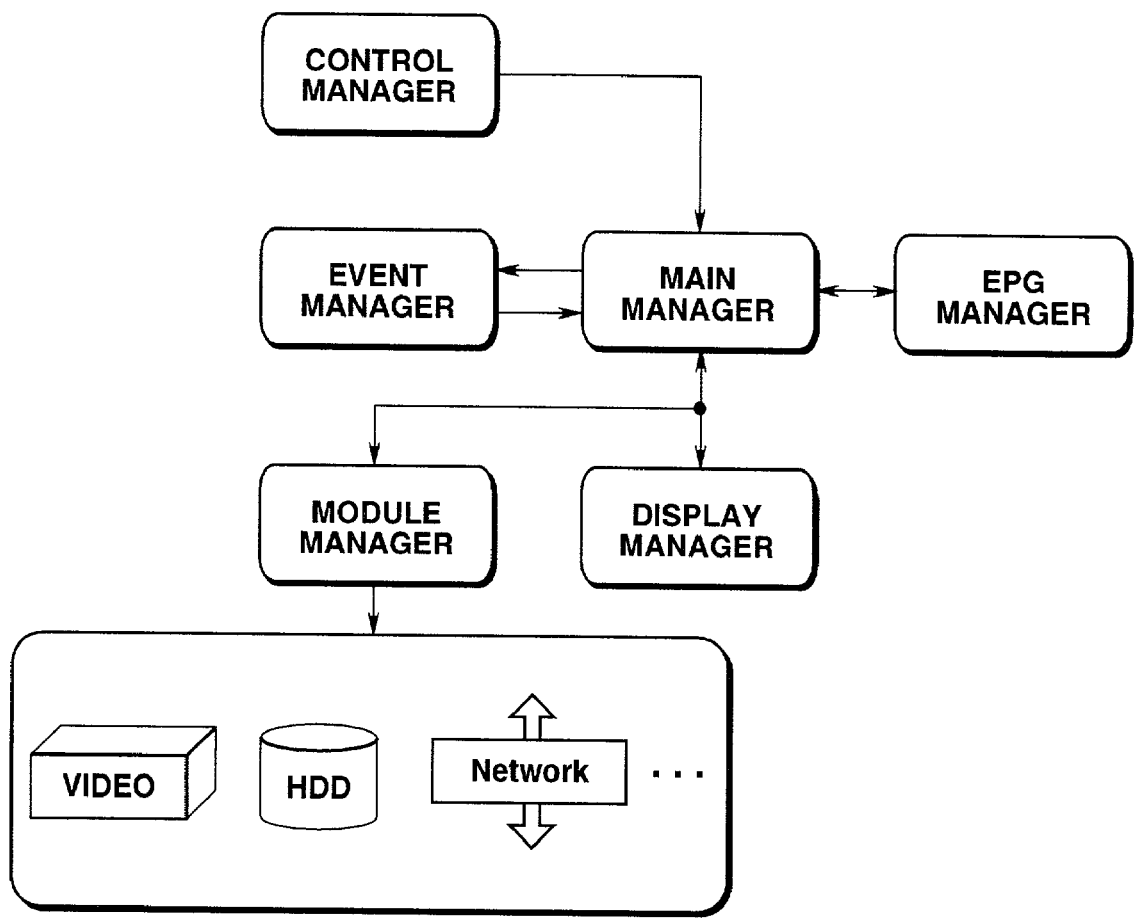
FIG. 12 illustrates a program of a CPU 16 of FIG. 5.

FIG. 12 shows an exemplary configuration of a program which the CPU 16 has. When the user inputs a certain command by operating the remote controller 7, a control manager notifies a main manager of the input. An EPG manager manages the EPG object. A display manager manages the display of a program guide based on the EPG object and the like. An event manager manages an event to be executed in accordance with the time. A module manager manages various equipments-connected to the IEEE 1394 bus 6 and various modules connected to the internal bus 23. The main manager manages each of the managers.

Specifically, the control manager notifies the main manager of an input from the user. The EPG manager carries out processing in accordance with an EPG retrieval processing request from the main manager. The event manager receives registration of an event from the main manager and notifies the main manager of the event. The display manager carries out processing in accordance with a display request from the main manager. The module manager carries out processing in accordance with a request for transmitting/receiving a message to/from each module, from the main manager.

When the EPG object for each program is received, the EPG manager transmits a message to each EPG object and receives notification of the genre and broadcast time of each program. Then, the EPG manager collects the notifications to generate a program page. For example, when the user operates a predetermined genre button of the genre selection buttons 102 on the remote controller 7, the control manager detects this operation and notifies the main manager of it. On receiving this notification, the main manager requests the EPG manager to retrieve a program of the designated genre.

Figure 13:
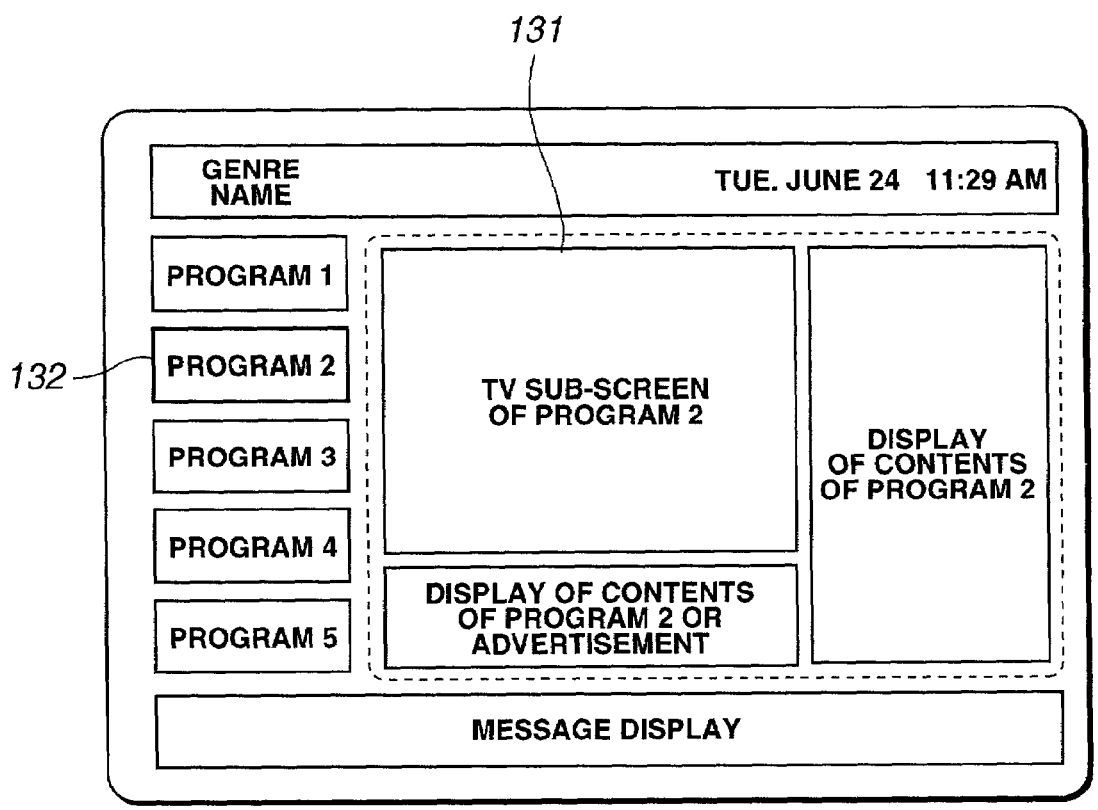
FIG. 13 shows an exemplary display on a monitor 5 of FIG. 5.

In response to this request, the EPG manager retrieves the program of the designated genre from the program table and notifies the main manager of the retrieval result. On receiving the notification from the EPG manager, the main manager requests the display manager to display the program on the notification. In response to this request, the display manager generates data for displaying an image as shown in FIG. 13. The main manager transfers the image data generated by the display manager to the module manager. The module manager outputs this image data to the monitor 5 through the IEEE 1394 bus 6 and causes the monitor 5 to display the image data. Thus, a program guide as shown in FIG. 13 is displayed on the monitor 5.

In this example, the genre name is displayed at the upper part of the screen. On the right side of the genre name, the broadcast date and time of the program are displayed. On the left part of the screen, five programs are displayed in the form of program logos. When the user operates the button 103C or 103D on the remote controller 7, a cursor 132 located on any of the five program logos is moved up and down. A miniature image of the program on which the cursor 132 is located is displayed at the center of the screen.

In this example, on the right side of the program image, the text showing the contents of the program is displayed. Then, on the lower side of the program image, the text showing the contents of the program or an advertisement is displayed. At the lower part of the screen, various messages are displayed.

An area 131 surrounded by a broken line in FIG. 13 indicates the display in the case where no particular display form is designated with respect to program introduction.

As shown in FIG. 14, the EPG object includes EPG ID for identifying the EPG object, program title, broadcasting station ID for identifying the broadcasting station, channel ID for identifying the channel, genre ID for identifying the genre of the program, broadcast start time of the program, broadcast end time, advertisement image, list of performers, program content text, sound effect, preferred information, introduction auxiliary data, program constituent data and the like. The display contents of FIG. 13 are based on the program content text of the EPG object shown in FIG. 14, and the advertisement is based on the advertisement image. The program logos are based on the introduction auxiliary data.

Since the EPG object is an object, it can transmit and receive messages to and from other objects such as a reserved recording event object and a program alarm event object, thus realizing events, as shown in FIG. 14.

Figure 15:
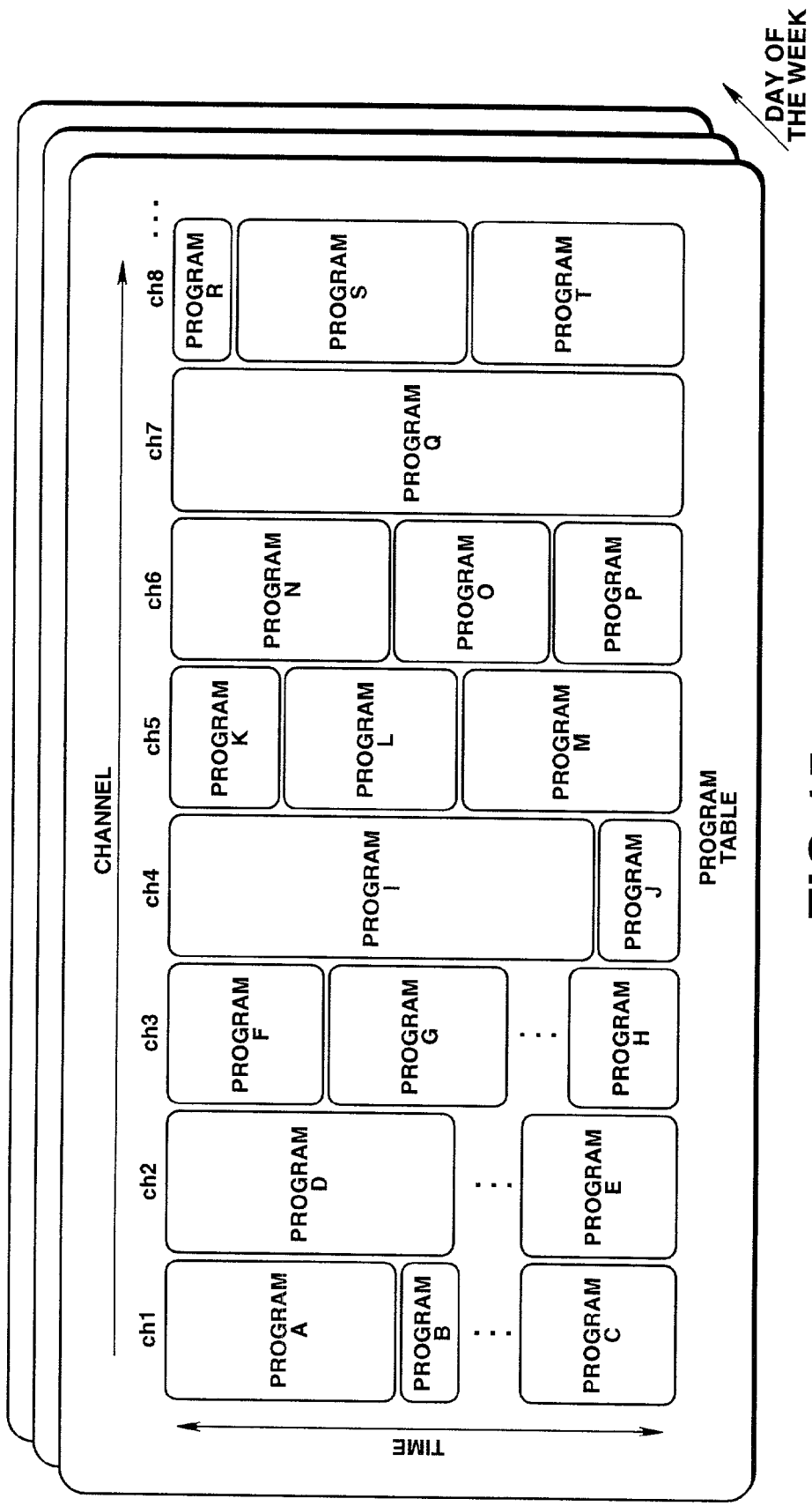
FIG. 15 illustrates a program table.

The EPG object thus transmitted and stored on the hard disk 22 is arranged on the program table with reference to the broadcast time and channel of the program, as shown in FIG. 15. That is, the program table is similar to program tables shown in newspaper and program information magazines.

Figure 16:
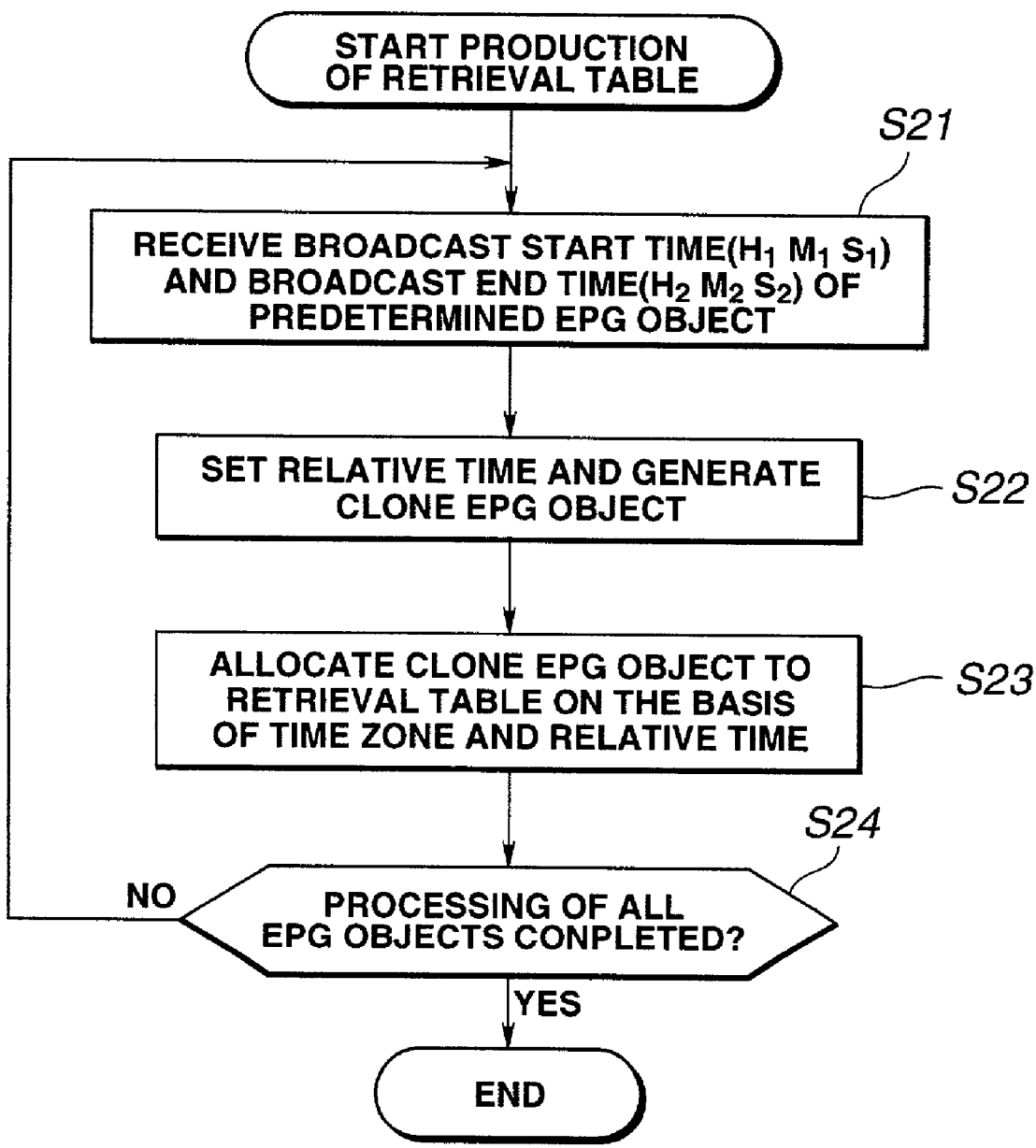
FIG. 16 is a flowchart for explaining retrieval table production processing.

However, if a program of a predetermined broadcast time is retrieved on the basis of such a program table, retrieval is time-consuming because the broadcast time of each EPG object is prescribed by the hour, minute and second. Thus, in the present embodiment, when the EPG object is stored on the hard disk 22, the EPG manager produces a retrieval table. FIG. 16 shows an example of such retrieval table production processing carried out by the EPG manager.

First, at step S21, the EPG manager outputs a message to a predetermined EPG object, and requests transfer of the broadcast start time ($H_1M_1S_1$) and broadcast end time ($H_2M_2S_2$) of the program. In response to this request, the EPG object transfers the stored broadcast start time and broadcast end time to the EPG manager. On receiving the broadcast start time and broadcast end time, the EPG manager sets the relative time and generates a clone EPG object, at step S22.

Figure 17:
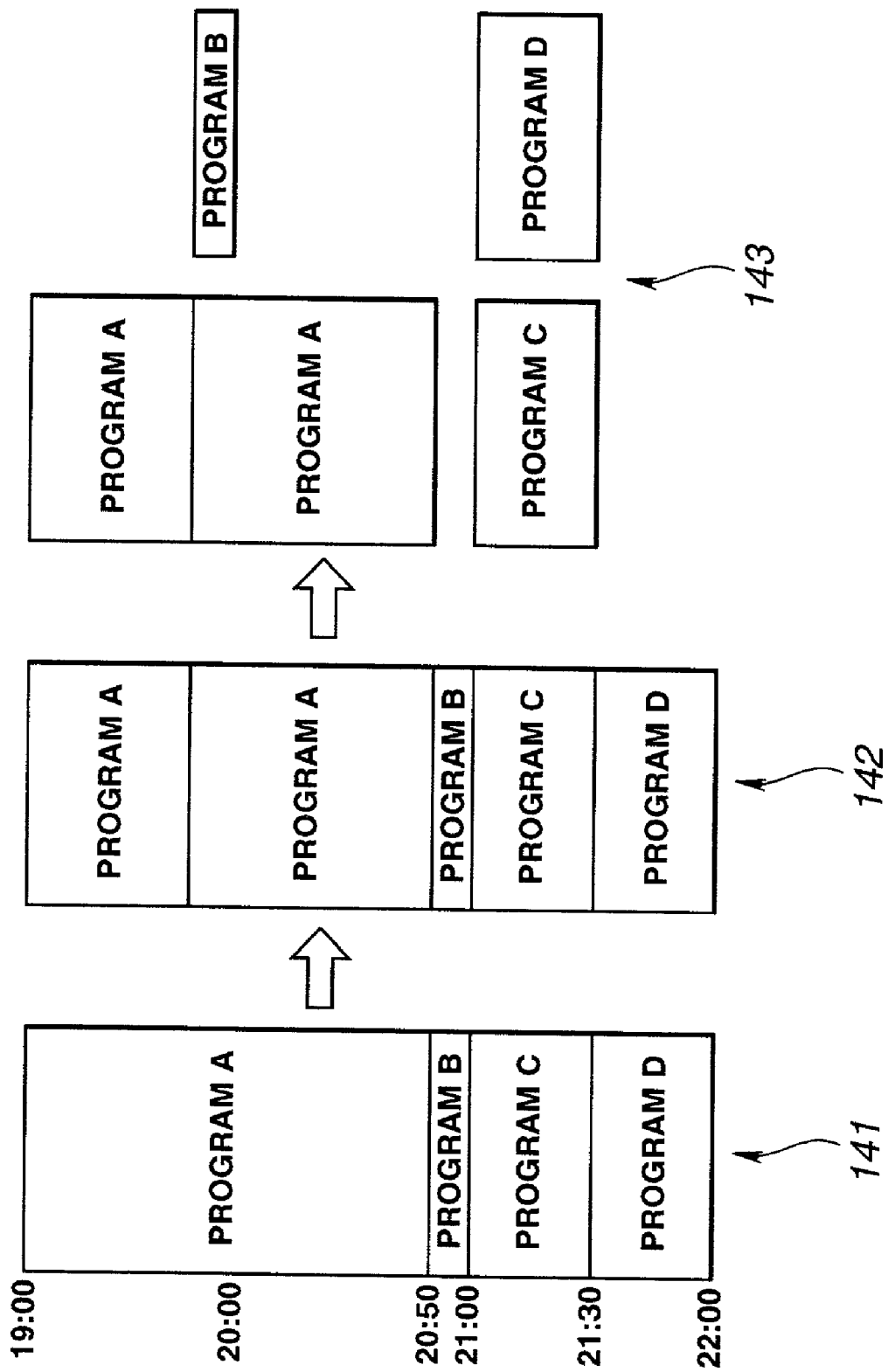
FIG. 17 illustrates retrieval table production processing.

For example, it is assumed that a program A starts at 19:00 and ends at 20:49, a program B starts at 20:50 and ends at 20:59, a program C starts at 21:00 and ends at 21:29, and a program D starts at 21:30 and ends at 21:59, as shown in a program configuration 141 of FIG. 17. In this case, clone EPG objects are generated by directly copying the EPG objects of the respective programs. Then, the relative time with respect to each time zone with a range of one hour is set, as shown in a program configuration 142 of FIG. 17. For example, since the program A is a program from 19:00 to 20:49, the relative start time of the first clone EPG is 00 minute and the relative end time is 59 minutes. The relative start time of the second clone EPG is 00 minute and the relative end time is 49 minutes.

As for the clone EPG object of the program B, the relative start time is 50 minutes and the relative end time is 59 minutes. As for the clone EPG object of the program C, the relative start time is 00 minute and the relative end time is 29 minutes. With respect to the clone EPG object of the program D, the relative start time is 30 minutes and the relative end time is 59 minutes. FIG. 14 shows such an EPG object having the relative start time and the relative end time registered.

Then, the processing goes to step 523, and the EPG manager carries out processing for allocating the clone EPG objects on the retrieval table with reference to the time zone. For example, the first clone EPG object of the program A is allocated to a time zone of 19:00 to 19:59 and the second clone EPG object of the program A is allocated to a time zone of 20:00 to 20:59, as shown in a program configuration 143 of FIG. 17. The clone EPG object of the program B is also allocated to the time zone of 20:00 to 20:59. The clone EPG objects of the programs C and D are allocated to a time zone of 21:00 to 21:59.

Thus, the program having a length of one hour or more is allocated over plural time zones.

In each time zone, each clone EPG object is arrayed with reference to the relative time.

Then, the processing goes to step S24 to determine whether processing of all the EPG objects has been completed or not. If there is an EPG object which has not been processed, the processing returns to step S21 and similar processing is carried out.

Figure 18:
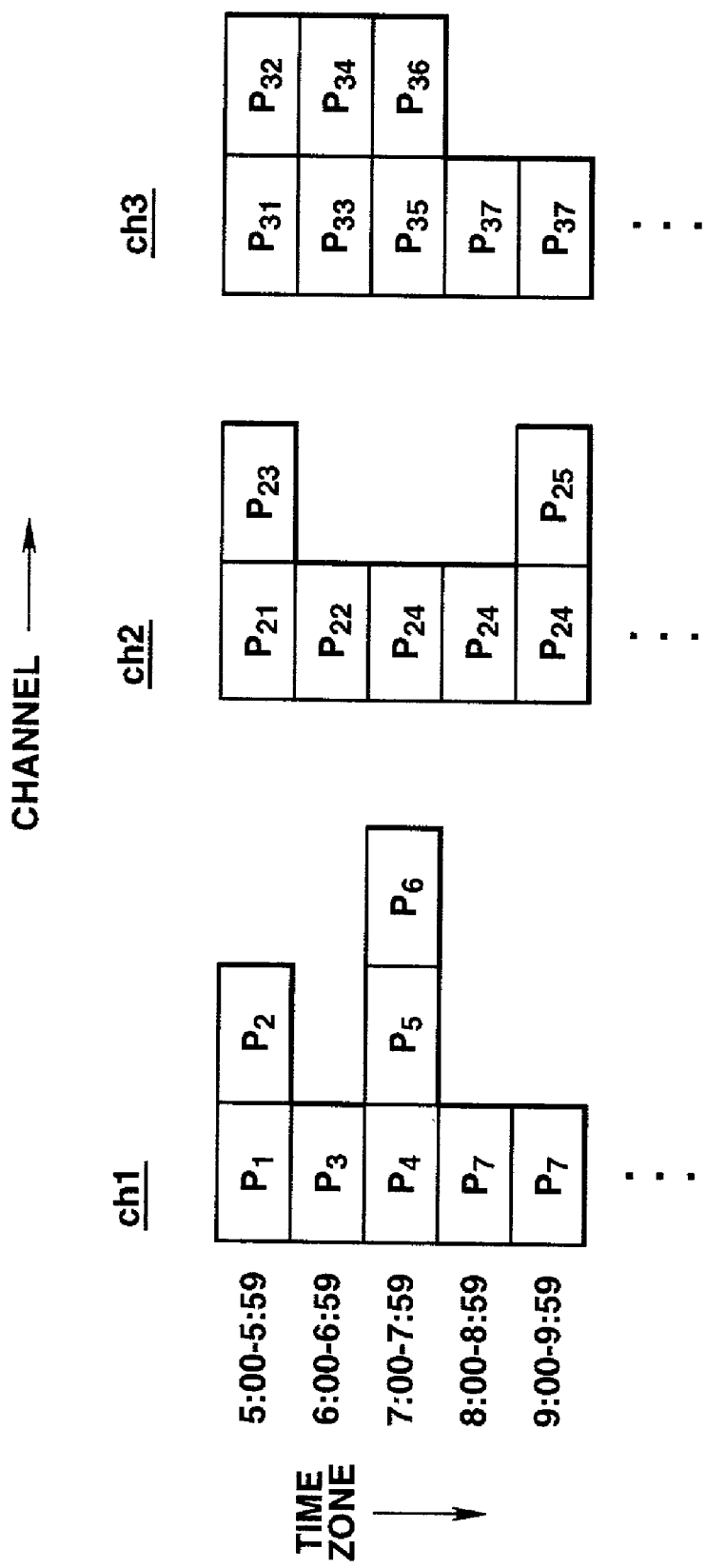
FIG. 18 shows an exemplary retrieval table.

FIG. 18 schematically shows the retrieval table produced by the EPG manager as described above. As shown in FIG. 18, each clone EPG object is arranged in the time zone with a range of one hour. In the case of FIG. 18, on a channel ch1, clone EPG objects of programs P1 and P2 are allocated to a time zone of 5:00 to 5:59, and a clone EPG object of a program P3 is allocated to a time zone of 6:00 to 6:59. To a time zone of 7:00 to 7:59, clone EPG objects of programs P4 to P6 are allocated. To time zones of 8:00 to 8:59 and 9:00 to 9:59, clone EPG objects of a program P7 are allocated.

On a channel ch2, a clone EPG object of a program P21 is allocated to the time zone of 5:00 to 5:59, and clone EPG objects of programs P22 and P23 are allocated to the time zone of 6:00 to 6:59. To the time zones of 7:00 to 7:59, 8:00 to 8:59 and 9:00 to 9:59, clone EPG objects of a program P24 are allocated. Also, a clone EPG object of a program P25 is allocated to the time zone of 9:00 to 9:59.

On a channel ch3, clone EPG objects of program P31 and P32 are allocated to the time zone of 5:00 to 5:59, and clone EPG objects of programs P33 and P34 are allocated to the time zone of 6:00 to 6:59. To the time zone of 7:00 to 7:59, clone EPG objects of programs P35 and P36 are allocated. To the time zones of 8:00 to 8:59 and 9:00 to 9:59, clone EPG objects of a program P37 are allocated.

Figure 19:
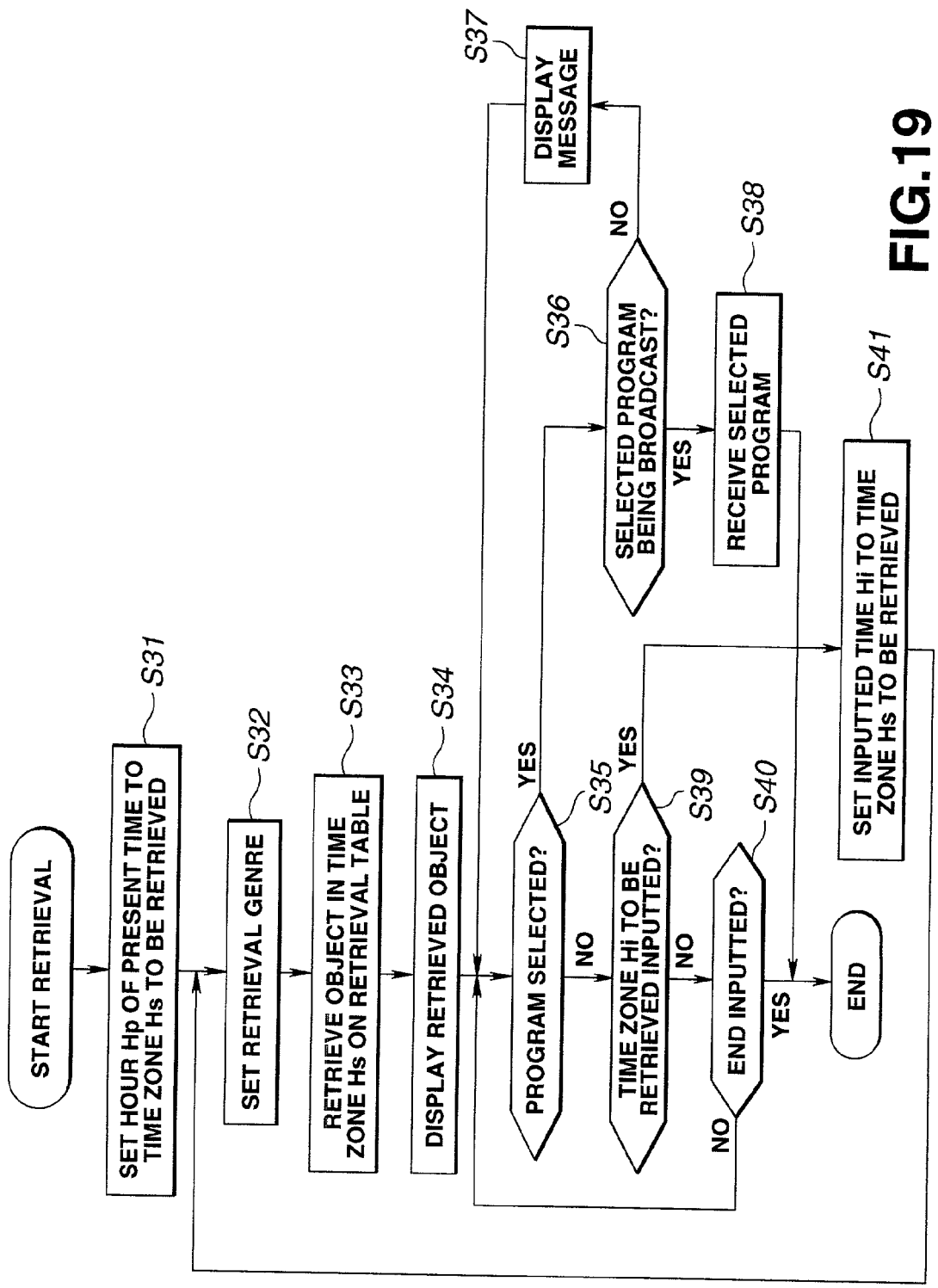
FIG. 19 is a flowchart for explaining retrieval processing.

As described above, when a command to display a program table is inputted from the control manager, the main manager requests the EPG manager to produce a program table. On receiving this request, the EPG manager retrieves a retrieval table produced as described above, and retrieves a program to be displayed on the program table. FIG. 19 shows an example of retrieval processing carried out by the EPG manager.

First, at step S31, the EPG manager sets the hour Hp of the hour, minute and second of the present time, to a time zone Hs to be retrieved. Then, the processing goes to step S32 to set the genre to be retrieved. That is, the EPG manager produces and prepares the retrieval table as shown in FIG. 18 for each genre. At step S32, which genre of retrieval table is to be used from among the retrieval tables is set. If any of the genre selection buttons 102 on the remote controller 7 is operated to designate a predetermined genre, that genre is set.

Then, the processing goes to step S33, and the EPG manager retrieves a clone EPG object of the time zone Hs from the retrieval table of the genre set at step S32. Then, at step S34, processing for displaying the retrieved clone EPG object is carried out. Specifically, the EPG manager reads out the program logo of the retrieved clone EPG object and transfers the program logo to the main manager. At this point, data of the contents of one program, that is, a program on which the cursor 132 is located in the example of FIG. 13, and data of advertisement are read out from the clone EPG object and transferred to the main manager. The main manager transfers, to the display manager, the data transferred from the EPG manager, and requests the display manager to display the data. In response to this request, the display manager produces display data. The display manager then outputs the produced display data to the monitor 5 through the module manager, and causes the monitor 5 to display the display data. Thus, a program table as shown in FIG. 13 is displayed on the monitor 5.

In the example of the retrieval table of FIG. 18, if the present time is in the time zone of 5:00 to 5:59, the programs P1, P2, P21, P31 and P32 are displayed as programs 1 to 5 in FIG. 13.

In this manner, at the time retrieval, the minute and second of the broadcast time are ignored and only the hour is used as the reference for retrieval. Thus, quick retrieval can be realized.

Then, the processing goes to step S35 to determine whether a program is selected or not. If a program is not selected, the processing goes to step S39 to determine whether or not a time zone Hi to be retrieved is inputted by the user. That is, if the user demands the display of a program of a time zone other than the present time, the user inputs that time zone by operating the number buttons 109 on the remote controller 7. Though not shown, the remote controller 7 has ten keys for inputting the time zone. If the time zone Hi to be retrieved is inputted, the processing goes to step 541 and the inputted time Hi is set to the time zone Hs to be retrieved. Then, the processing returns to step S32 and the subsequent processing is repeated. As a result, for example, if the time zone of 7:00 to 7:59 is inputted as the time zone to be retrieved, the programs P4 to P6, P24, P35 and P36 are retrieved and displayed. If the time zone of 8:00 to 8:59 is inputted, the programs P7, P24 and P37 are retrieved and displayed.

The program P24 is a program of not less than two hours and less than three hours, as shown in FIG. 18. Therefore, if the time zone of 7:00 to 7:59, 8:00 to 8:59 or 9:00 to 9:59 is inputted as the time zone to be retrieved, the program P24 is retrieved and displayed in any case.

If it is determined at step S39 that a time zone Hi to be retrieved is not inputted, the processing goes to step S40 to determine whether the end of retrieval is inputted or not. If the end is not inputted, the processing returns to step S35 and similar processing is repeated.

If it is determined at step S35 that a program is selected, the processing goes to step S36 to determine whether the program selected on the program table is currently being broadcast or not. This determination can be carried out by comparing the broadcast start time and broadcast end time of the clone EPG object with the present time. If the selected program is currently being broadcast, the processing goes to step S38, and the EPG manager requests the main manager to receive the selected program. In response to this request, the main manager controls the module manager and causes the tuner 11, for example, to receive the designated program. The program received by the tuner 11 is suitably processed by the image processing module 15. After that, the program is outputted to and displayed on the monitor 5 from the AV control module 19 through the IEEE 1394 bus 6.

If it is determined at step S36 that the selected program is not currently being broadcast, the processing goes to step S37 and the EPG manager carries out message display processing. Specifically, at this point, the EPG manager requests the display manager, through the main manager, to display a message such as "This program is not currently being broadcast" in the message display section at the lower part of the screen shown in FIG. 13. In response to this request, the message is displayed.

It is to be noted that the present invention can also be applied to the case where the EPG information is not in the form of object.

Although the range of the time zone is defined as one hour, it may also be 30 minutes or 15 minutes.

As a second embodiment, the receiving device 1 which enables effective display of an EPG and quick selection of a program will now be described.

Figure 20:
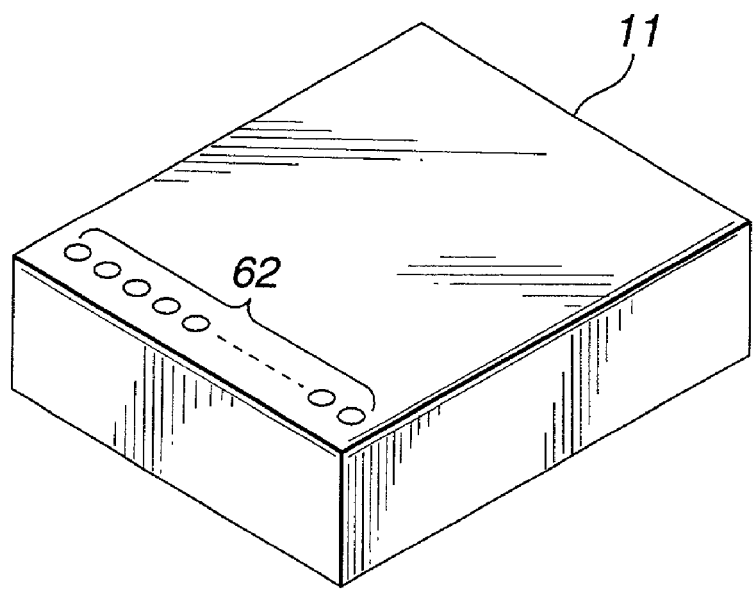
FIG. 20 is a perspective view showing the structure of appearance of a tuner 11 of FIG. 5.
Figure 21:
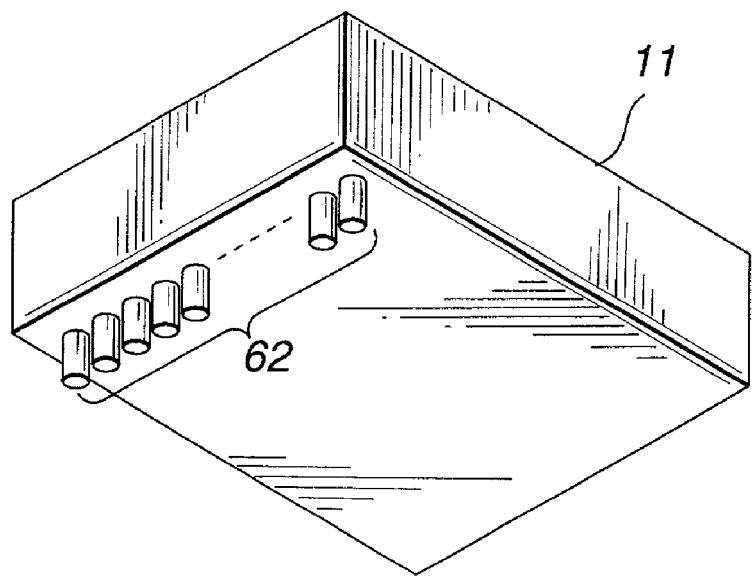
FIG. 21 is a perspective view showing the structure of appearance of the tuner 11 of FIG. 5.
Figure 22:
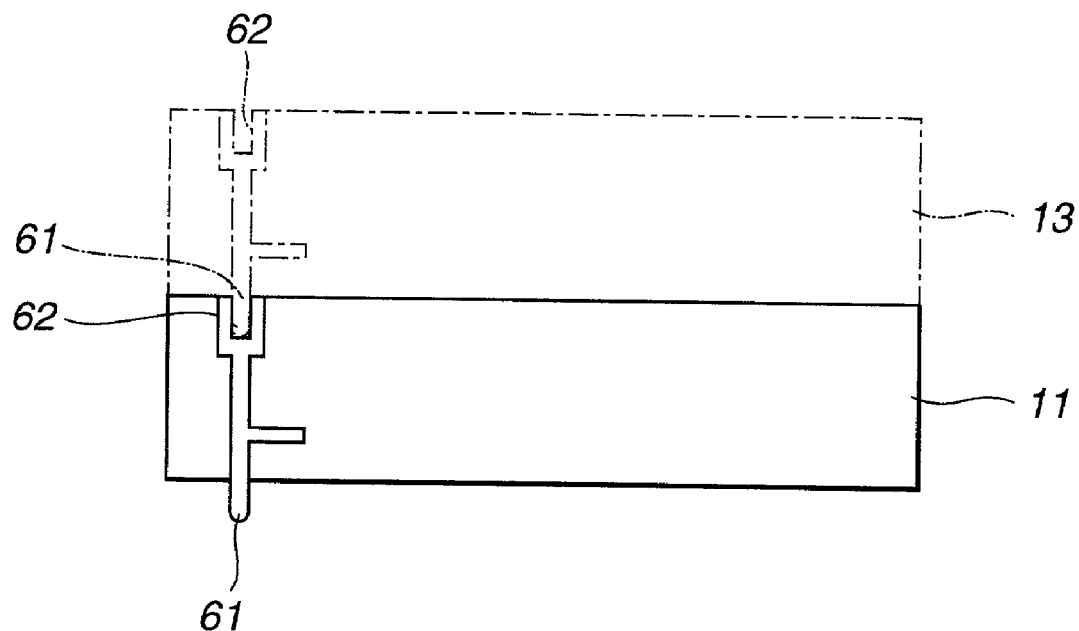
FIG. 22 shows the state where the tuner 11 and a tuner 13 of FIG. 5 are stacked.
Figure 23:
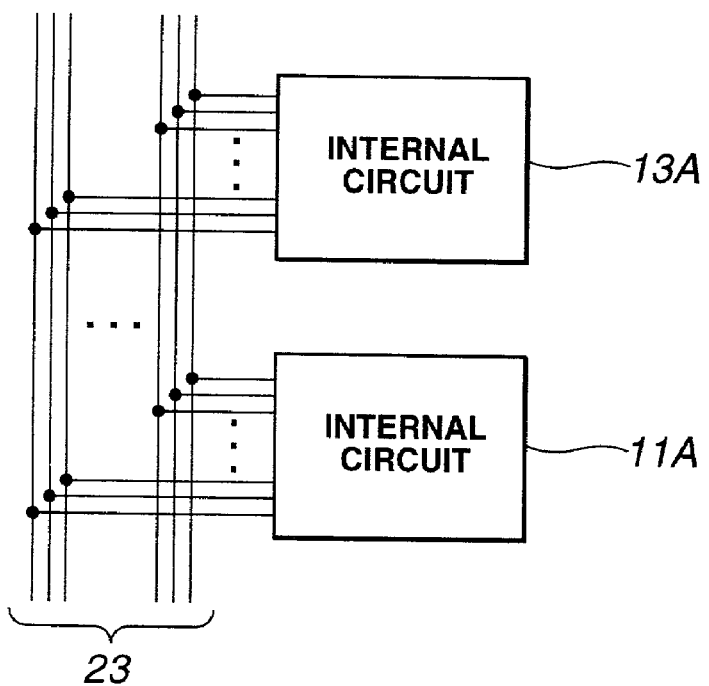
FIG. 23 shows the state where internal circuits of the tuner 11 and the tuner 13 of FIG. 5 are connected.

The tuner 11 shown in FIG. 15 has receiving sections 62 for 32 bits provided on the upper surface thereof, and pins 61 for 32 bits provided on the lower surface thereof, as shown in FIGS. 20 and 21. These are connected to the internal bus 23 of 32 bits. Similarly, the tuner 13 and the communication module 14 have receiving sections provided on the upper surfaces thereof and pins provided on the lower surfaces thereof, though not shown. For example, when the tuner 13 is set on the tuner 11 as shown in FIG. 22, the pins 61 of the tuner 13 are coupled with the receiving sections 62 of the tuner 11. Thus, an internal circuit 11A of the tuner 11 and an internal circuit 13A of the tuner 13 are electrically connected to the internal bus 23 of 32 bits, as shown in FIG. 23.

Although not shown, the communication module 14 has the receiving section and pins, too. For example, when the communication module 14 is set on the tuner 13 shown in FIG. 22, an internal circuit of the communication module 14 is connected to the internal bus 23. With such a structure, the internal circuits can be electrically connected to the internal bus 23, simply by stacking the respective modules. Thus, necessary modules can be easily added within a small occupied space.

Figure 24:
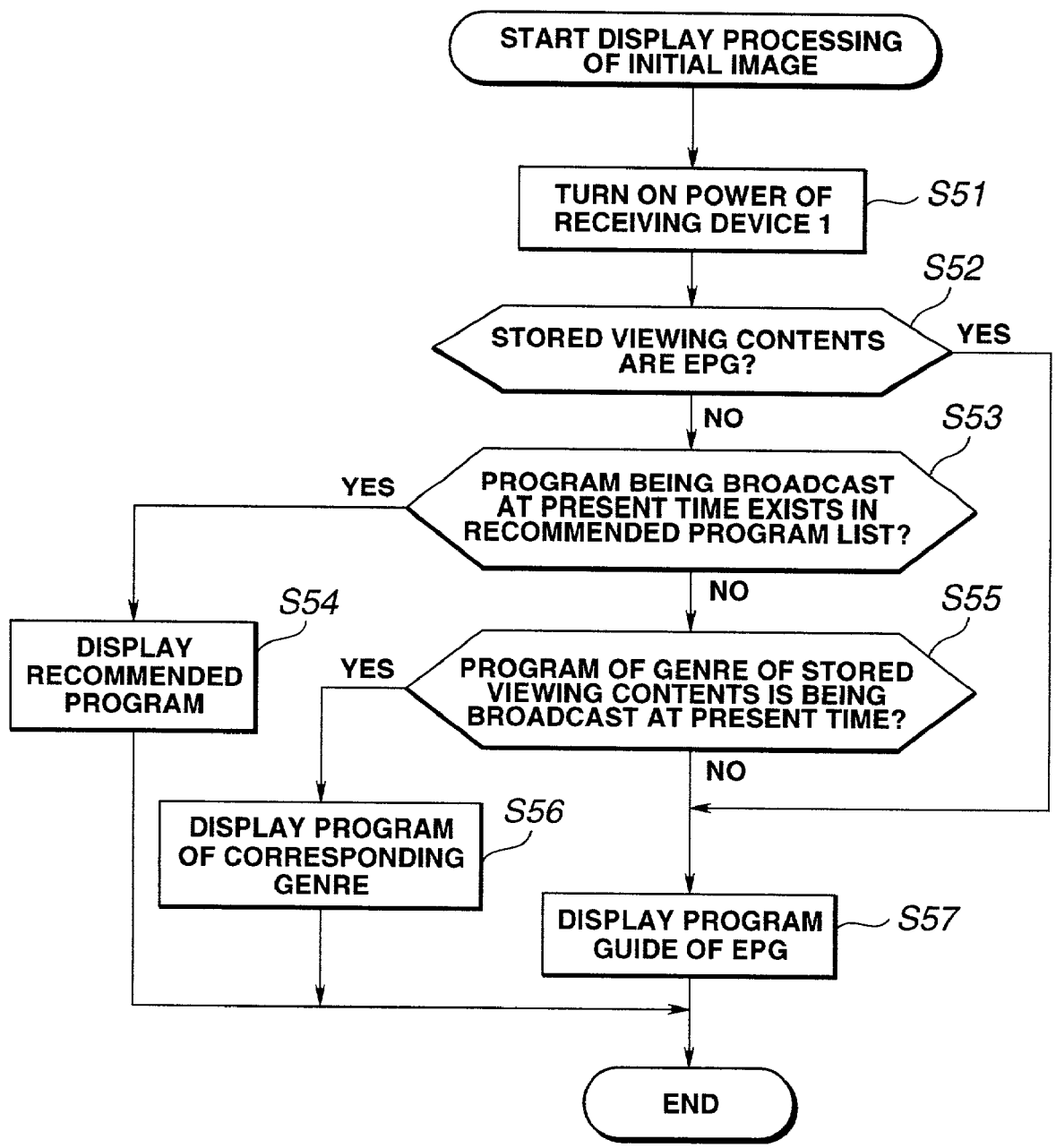
FIG. 24 is a flowchart for explaining initial image display processing.

With reference to the flowchart of FIG. 24, processing for displaying an initial image in the case where the power of the receiving device 1 is turned on will now be described. It is assumed that every time the power of the receiving device 1 is turned off, the contents viewed immediately before the power is turned off are stored (updated) on the hard disk 22. This feature will be later described in detail with reference to FIG. 29. If the user operates the power button 101 on the remote controller 7 in the state where the power of the receiving device 1 is off, the power of the receiving device 1 is turned on, at step S51. Then, at step S52, the CPU 16 determines whether the viewing contents stored at the last time when the power is turned off are an EPG or not. If it is determined that the viewing contents are an EPG, the processing goes to step S57 to carry out processing for displaying an EPG program guide on the monitor 5. Thus, a program guide as shown in FIG. 13 is displayed on the monitor 5.

At this point, information of programs to be broadcast within a predetermined time period such as two hours from the present time is displayed in the program guide.

If it is determined at step 52 that the stored viewing contents are not an EPG but a predetermined program, the processing goes to step S53 to determine whether or not a program being broadcast at the present time exists in programs registered on a recommended program list of the EPG. If it is determined that a recommended program being broadcast at the present tune exists, the processing goes to step S54, and the CPU 16 controls the tuner 11 or the tuner 13 to carry out processing for receiving the recommended program and displaying the image thereof on the monitor 5.

Figure 25:
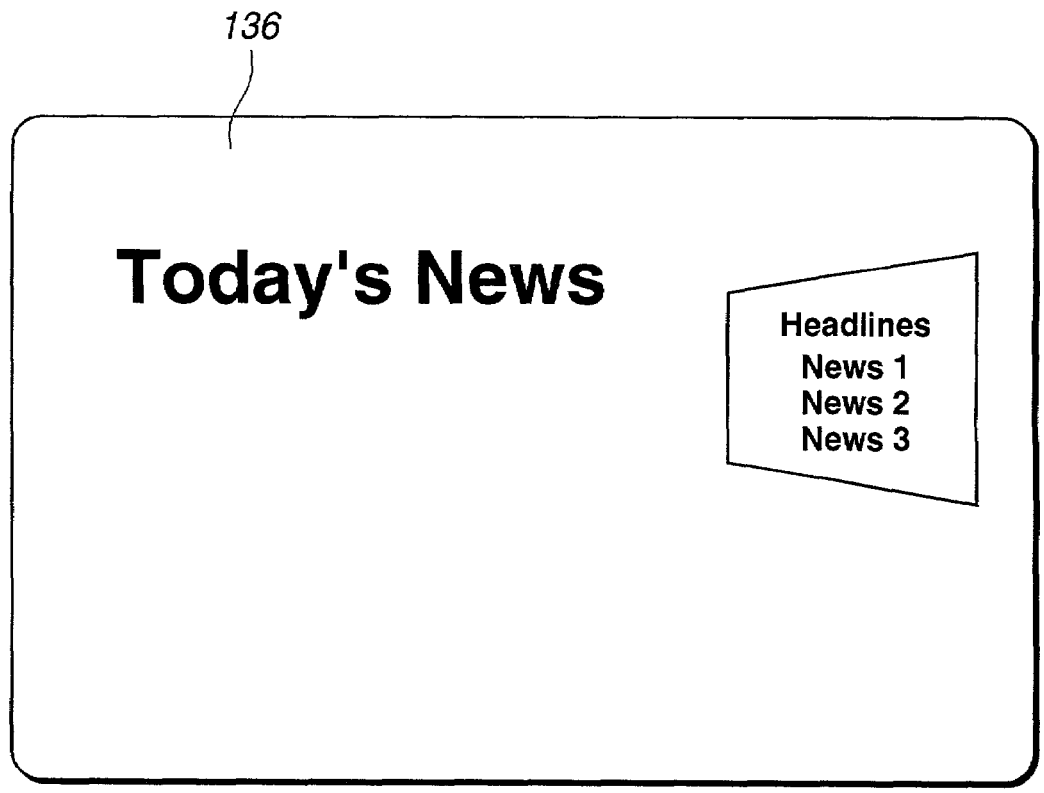
FIG. 25 shows an exemplary display of a normal program.

If it is determined at step 553 that a recommended program being broadcast at the present time does not exist, the processing goes to step S55. At step S55, it is determined whether or not a program of a genre stored as the genre of the program viewed at the time of turning off the power, for example, news, is being broadcast at the present time. If it is determined that a program of the corresponding genre is being broadcast at the present time, the processing goes to step S56, and the CPU 16 controls the tuner 11 or the tuner 13 to carry out processing for receiving the program and displaying the image thereof on the monitor 5. Thus, an image of a program 136 which is currently being broadcast, as shown in FIG. 25, is displayed on the monitor 5. If it is determined at step 55 that a program of the corresponding genre is not being broadcast at the present time, the processing goes to step S57, and the CPU 16 carries out processing for displaying the program guide of the EPG on the monitor 5.

In this manner, an initial image at the time when the power of the receiving device 1 is turned on is displayed.

The user can set the priority of the initial image.

When the user operates the button 103C or 103D on the remote controller 7 to select a predetermined program, the cursor located on one of the five program logos is moved up and down. Then, a miniature image of the program on which the cursor is located is displayed at the center of the screen. When the user operates the button 103E in this state, the image of the selected program is displayed as shown in FIG. 25.

On the other hand, when the user operates the button 103A or 103B on the remote controller 7 in the state as shown in FIG. 13, the genre is switched, and the programs displayed in a list are also switched to programs corresponding to that genre. When the button 103A is continuously operated, the genre is switched in a circulating manner, for example, in the order of "news", "sports", "variety", "information", "animation", "shopping", "weather", "movie", "drama", "education", "music", and "recommended". When the button 103B is continuously operated, the genre is switched in the direction opposite to that in the case of the button 103A.

Such genre switch processing is similarly carried out in the case where the button 103A or 103B is operated in the state that the image of the normal program 136 being broadcast is displayed on the monitor 5 as shown in FIG. 25, not in the state that the program guide is displayed.

Figure 26:
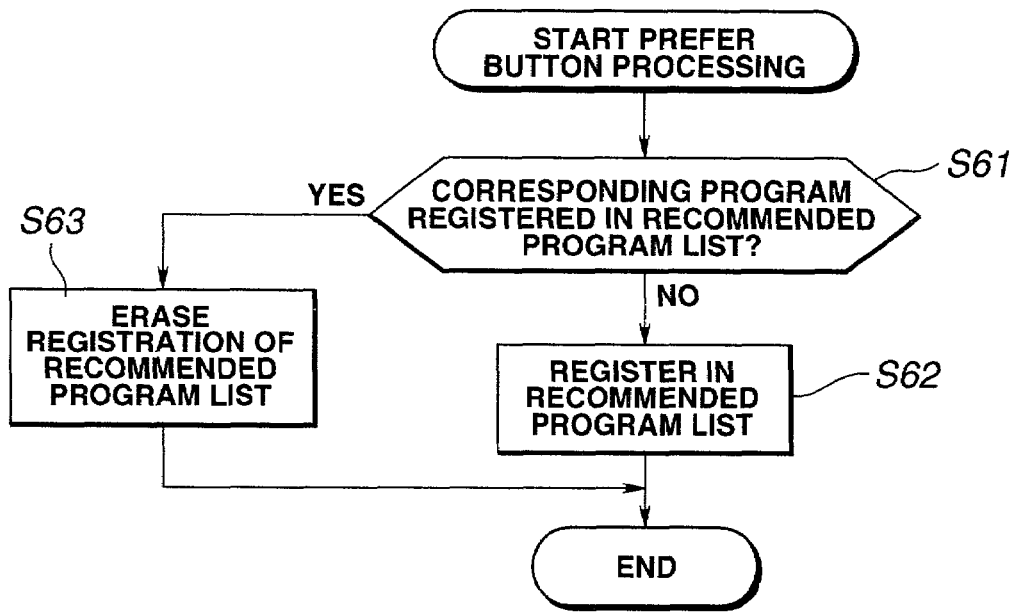
FIG. 26 is a flowchart for explaining processing in the case where a prefer button 104 of FIG. 6 is operated.
Figure 27:
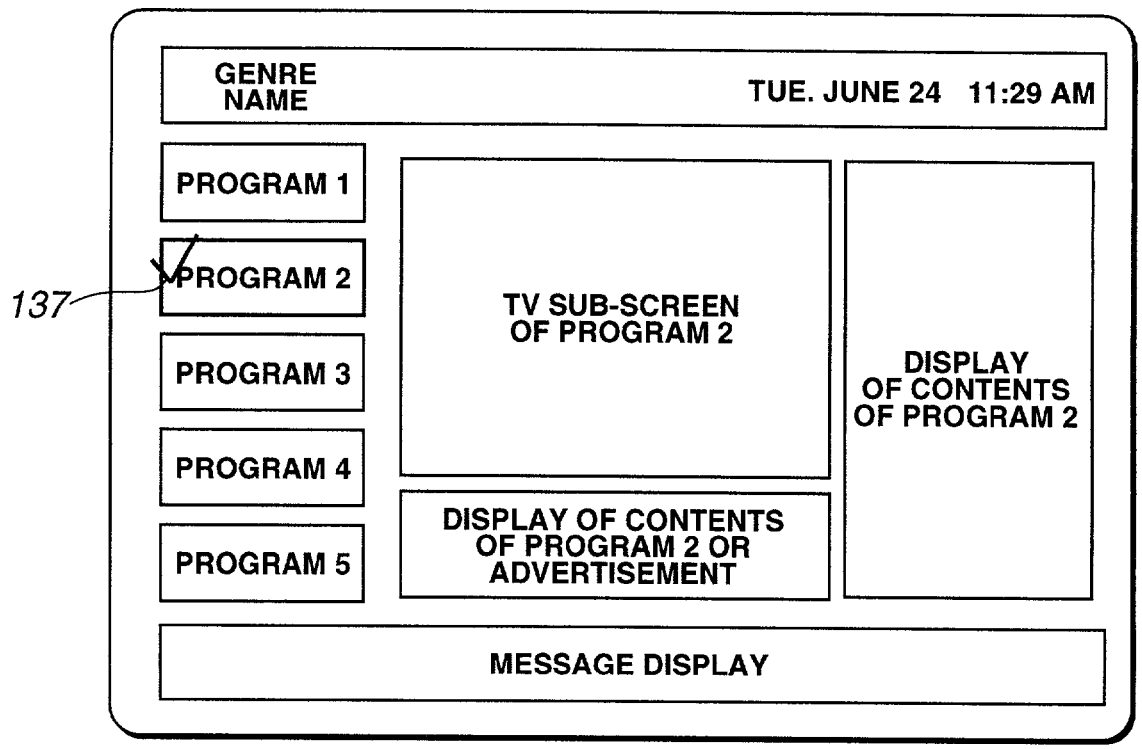
FIG. 27 shows an exemplary display of a program guide in the case where the prefer button 104 is operated.

With reference to the flowchart of FIG. 26, an example of processing in the case where the prefer button 104 on the remote controller 7 is operated will now be described. When the user operates the prefer button 104 in the state as shown in FIG. 13, it is determined at step S61 whether or not the corresponding program is registered in the recommended program list. When user takes a look at the image or the contents of the "program 2" shown in FIG. 13 and wishes to view the program, the user operates the prefer button 104. If this "program 2" is not yet registered in the recommended program list, the processing goes to step S62 to carry out processing for registering the program into the recommended program list. Thus, a check mark 137 is displayed on the registered "program 2", as shown in FIG. 27.

If it is determined at step S61 that the designated program is already registered in the recommended program list, the processing goes to step S63 to carry out processing for deleting the program from the recommended program list.

Figure 28:
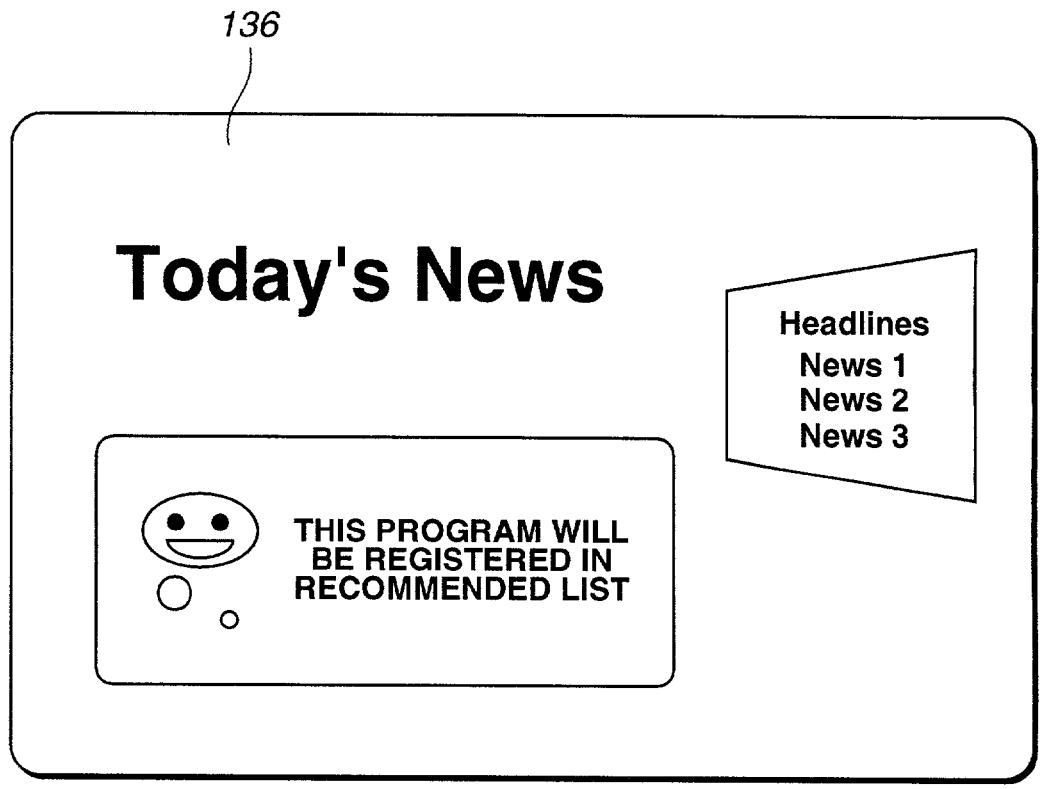
FIG. 28 shows an exemplary display of a normal program in the case where the prefer button 104 is operated.

The above-described processing is similarly carried out in the case where the prefer button 104 is operated in the state that the image of the normal program is displayed on the monitor 5 as shown in FIG. 25, not in the state that the program guide is displayed. Then, a message image indicating that the currently viewed program will be registered is displayed on the monitor 5 in such a manner as to overlap the image which is currently being broadcast, as shown in FIG. 28.

Thus, the user can register a desired program into the recommended program list. When the user selects the recommend button of the genre selection buttons 102 on the remote controller 7, the recommended program list having the program registered therein in the above-described manner is displayed on the monitor 5.

Figure 29:
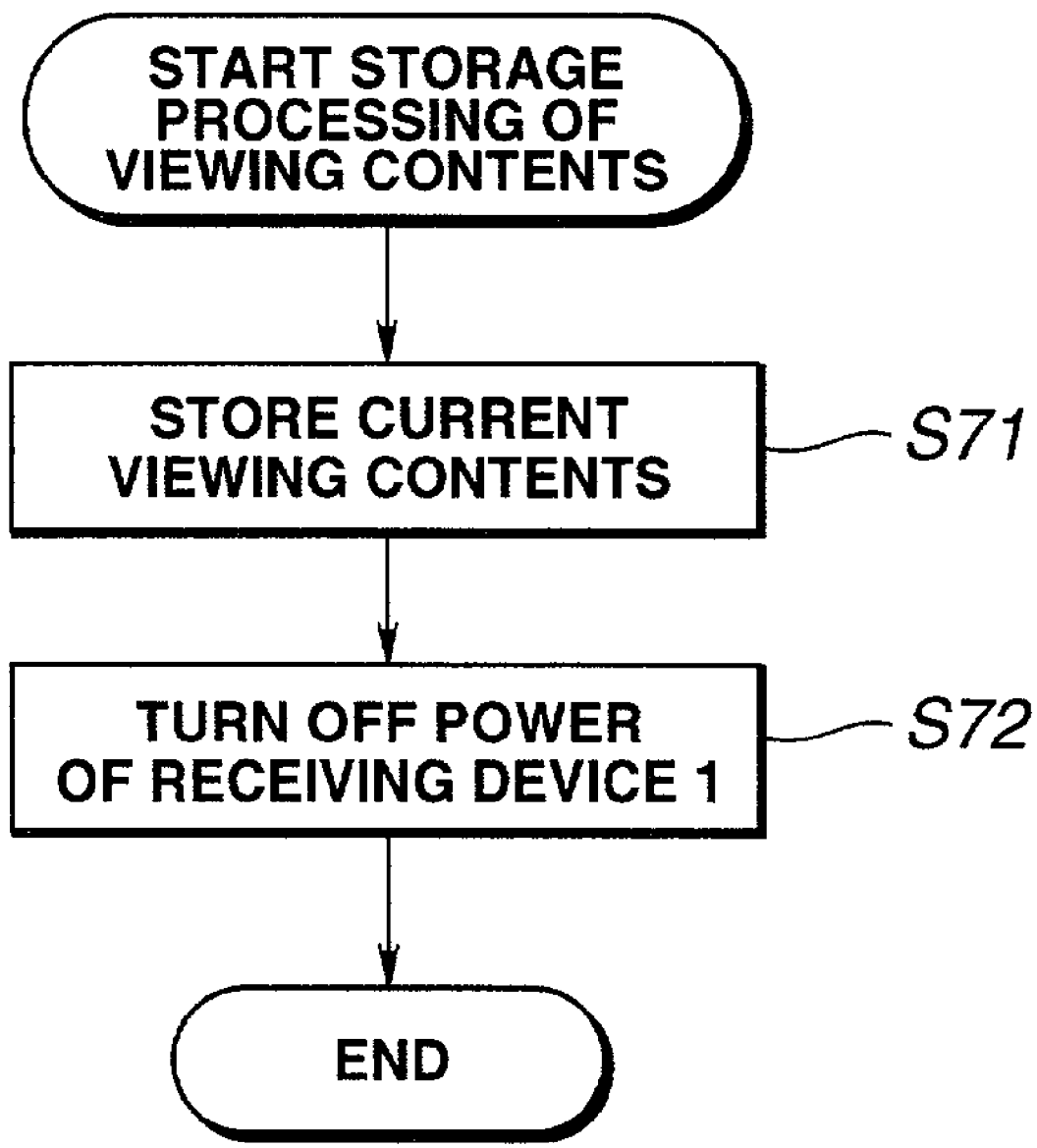
FIG. 29 is a flowchart for explaining viewing contents storage processing.

With reference to the flowchart of FIG. 29, processing for storing the viewing contents immediately before the power of the receiving device 1 is turned off will now be described. When the user operates the button 101 on the remote controller 7 in the state that the EPG or normal program is displayed on the monitor 5, the CPU 16 causes the hard disk 22 to record the present viewing contents, at step S71. Then, at step S72, the power of the receiving device 1 is turned off.

By thus storing the viewing contents immediately before the power is turned off, an initial image is displayed in accordance with the stored viewing contents when the power is turned on next.

As a transmission medium for transmitting a program for carrying out processing as described above to the user, a communication medium such as a network or a satellite can be used as well as a recording medium such as a magnetic disk, a CDROM or a solid state memory.

As described above, according to the receiver, the program retrieval method and the receiving method according to the present invention, programs are partitioned for each time zone with a predetermined range with reference to the broadcast time thereof, and a program of a predetermined broadcast time is retrieved from the programs partitioned for each time zone. Thus, a desired program can be retrieved in a short period of time.

The invention claimed is:

1. A receiver, comprising:
 a receiving unit operable to receive program signals and first program guide information, the first program guide information including broadcasting time information of a program;
 a production unit operable to produce second program guide information from the first program guide information, the second program guide information including the broadcasting time information of the program for every time slot spanned by the program;
 an allocation unit operable to allocate the second program guide information as one or more clone EPG objects in a retrieval table for retrieval based upon the time slots spanned by the program, wherein each of the clone EPG objects is allocated to a single one of the time slots spanned by the program by directly copying the first program guide information of the program as the clone EPG objects and then setting each clone EPG object to a respective one of the time slots spanned by the program;
 a retrieval unit employing a given one of the time slots as a search condition to set retrieval processing, the retrieval unit being operable to retrieve a respective one of the clone EPG objects for the second program guide information from the retrieval table using the given time slot as the search condition to identify the respective clone EPG object for the program,
 wherein a program table for displaying information of the program to a user is generated based on the respective clone EPG object;
 a storage unit operable, in response to the receiver receiving an instruction to turn off a power source of the receiver, to store content information indicating whether content displayed immediately before the receiver turns off the power source is a program guide or a program, and if the content displayed immediately before the receiver turns off the power source is the program, to store genre information indicating a genre of the program; and
 a display controller operable to determine whether to display the program guide, a recommended program, or another program of the genre indicated by the stored genre information as an initial image in response to the power source being subsequently turned on, the determination being based solely on the content information and the genre information that were stored immediately before the receiver turns off the power source,
 the program guide being displayed as the initial image if the content information stored in said storage unit indicates that the program guide was displayed immediately before turning off the power source of the receiver, the recommended program being displayed as the initial image if the content information stored in said storage unit indicates that the program was displayed immediately before turning off the power source of the receiver and the currently broadcast program is the recommended program, the recommended program being determined based on the received program guide information and previously set user preferences, and the another program of the genre indicated by the stored information being displayed as the initial image if the content information stored in said storage unit indicates that the program was displayed immediately before turning off the power source of the receiver and the currently broadcast program is of the genre indicated by the stored genre information.

2. The receiver as claimed in claim 1, wherein the program guide is displayed as the initial image if the content information indicates that the program was displayed immediately before turning off the power source of the receive and the currently broadcast program is not the recommended program and is not of the genre indicated by the stored genre information.

3. The receiver as claimed in claim 1, wherein the production unit produces a retrieval table for each genre of program.

4. The receiver as claimed in claim 1, further comprising:
an inputting unit operable to receive an inputted broadcast time to be retrieved;
a program retrieval unit operable to execute program retrieval on the basis of the input broadcast time and the retrieval table; and
a processing unit operable to read stored program information of a retrieved program and carrying out display processing to display the information of the program to the user.

5. The receiver as claimed in claim 1, wherein a plurality of programs are allocated in a selected time slot for a given channel, and separate clone EPG objects are assigned to each respective one of the plurality of programs in the selected time slot.

6. The receiver as claimed in claim 1, wherein the program table includes program data of a plurality of programs for a predetermined genre.

7. In a receiver having a power source, a method comprising:
receiving program signals and first program guide information, the first program guide information including broadcasting time information of a program;
producing second program guide information from the first program guide information, the second program guide information including the broadcasting time information of the program for every time slot spanned by the program;
allocating the second program guide information as one or more clone EPG objects in a retrieval table for retrieval based upon the time slots spanned by the program, each of the clone EPG objects being allocated to a single one of the time slots spanned by the program by directly copying the first program guide information of the program as the clone EPG objects and then setting each clone EPG object to a respective one of the time slots spanned by the program;
employing a given one of the time slots as a search condition to set retrieval processing;
retrieving a respective one of the clone EPG objects for the second program guide information from the retrieval table using the given time slot as the search condition to identify the respective clone EPG object for the program;
generating a program table for displaying information of the program to a user based on the respective clone EPG object;
receiving an instruction to turn off a power source of the receiver;
storing, in response to receiving the instruction to turn off the power source, content information indicating whether content displayed immediately before turning off the power source is a program guide or a program, and when the content displayed immediately before turning off the power source of the receiver is the program, storing genre information indicating a genre of the program;
turning off the power source; and
determining whether to display the program guide, a recommended program, or another program of the genre indicated by the stored genre information as an initial image in response to the power source being subsequently turned on, the determination being based solely on the content information and the genre information that were stored immediately before turning off the power source,
the program guide being displayed as the initial image if the stored content information indicates that the program guide was displayed immediately before turning off the power source of the receiver,
the recommended program being displayed as the initial image if the stored content information indicates that the program was displayed immediately before turning off the power source of the receiver and the currently broadcast program is the recommended program, the recommended program being determined based on the received program guide information and previously set user preferences, and
the another program of the genre indicated by the stored information being displayed as the initial image if the stored content information indicates that the program was displayed immediately before turning off the power source of the receiver and the currently broadcast program is of the genre indicated by the stored genre information.

8. The method as claimed in claim 7, wherein the program guide is displayed as the initial image if the content information indicates that the program was displayed immediately before turning off the power source of the receiver and the currently broadcast program is not the recommended program and is not of the same genre indicated by the stored genre information.

9. The method as claimed in claim 7, wherein the producing step produces a retrieval table for each genre of program.

10. The method as claimed in claim 7, further comprising:
inputting a broadcast time to be retrieved;
executing program retrieval on the basis of the input broadcast time and the retrieval table; and
reading stored program information of a retrieved program and carrying out display processing to display the information of the program to the user.

11. The method as claimed in claim 7, wherein a plurality of programs are allocated in a selected time slot for a given channel, and separate clone EPG objects are assigned to each respective one of the plurality of programs in the selected time slot.

12. The method as claimed in claim 7, wherein the program table includes program data of a plurality of programs for a predetermined genre.

* * * * *